US006772162B2

(12) United States Patent
Waldo et al.

(10) Patent No.: US 6,772,162 B2
(45) Date of Patent: *Aug. 3, 2004

(54) LEASE RENEWAL SERVICE

(75) Inventors: James H. Waldo, Dracut, MA (US); John W. F. McClain, Arlington, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/288,542

(22) Filed: Nov. 6, 2002

(65) Prior Publication Data

US 2003/0093505 A1 May 15, 2003

Related U.S. Application Data

(63) Continuation of application No. 09/955,177, filed on Sep. 19, 2001, now Pat. No. 6,499,049, which is a continuation of application No. 09/691,104, filed on Oct. 19, 2000, now Pat. No. 6,449,648, which is a continuation of application No. 09/332,512, filed on Jun. 14, 1999, now Pat. No. 6,237,009, which is a continuation-in-part of application No. 09/152,062, filed on Sep. 11, 1998, now Pat. No. 6,314,435, which is a continuation-in-part of application No. 08/729,421, filed on Oct. 11, 1996, now Pat. No. 5,832,529.

(51) Int. Cl.⁷ ............................................. G06F 17/30
(52) U.S. Cl. ...................... 707/10; 707/104.1; 707/206; 709/203; 709/226
(58) Field of Search ................................ 707/10, 104.1, 707/201, 203, 206, 202, 9; 709/104, 201, 203, 226

(56) References Cited

U.S. PATENT DOCUMENTS

| 4,567,359 A | 1/1986 | Lockwood ................... 235/381 |
| 4,992,940 A | 2/1991 | Dworkin ....................... 705/26 |
| 5,101,346 A | 3/1992 | Ohtsuki ....................... 709/100 |
| 5,253,165 A | 10/1993 | Leiseca et al. ................. 705/5 |

(List continued on next page.)

OTHER PUBLICATIONS

Cary G. Gray and David R. Cheriton, "Leases: An Efficient Fault–Tolerant Mechanism for Distributed File Cache Consistency", ACM, 1989, pp. 201–210.*

Andrew Birrell, Greg Nelson, Susan Owicki, and Edward Wobber, "Network Objects", ACM, 1993, pp. 217–230.*

(List continued on next page.)

*Primary Examiner*—John E. Breene
*Assistant Examiner*—Cheryl Lewis
(74) *Attorney, Agent, or Firm*—Finnegan, Henderson, Farabow, Garrett & Dunner, L.L.P.

(57) ABSTRACT

In accordance with methods and systems consistent with the present invention, a lease manager is provided for managing leases between clients and other network services. To use the lease manager, a client enters into a management lease with the lease manager, specifying an amount of time during which the lease manager can manage preexisting leases between the client and network services on behalf of the client. This management includes renewing the preexisting leases with the other network services. Further, the lease manager notifies the client when a lease between the lease manager and the client is near expiration. The lease manager also notifies the client of failed attempts to renew the preexisting leases, as well as the management lease, either with a network service or with the lease manager.

25 Claims, 18 Drawing Sheets

U.S. PATENT DOCUMENTS

| | | | |
|---|---|---|---|
| 5,319,542 A | 6/1994 | King, Jr. et al. | 705/27 |
| 5,327,559 A | 7/1994 | Priven et al. | 709/101 |
| 5,475,840 A | 12/1995 | Nelson et al. | 709/331 |
| 5,511,196 A | 4/1996 | Shackelford et al. | 709/315 |
| 5,544,040 A | 8/1996 | Gerbaulet | 705/26 |
| 5,592,375 A | 1/1997 | Salmon et al. | 705/7 |
| 5,664,110 A | 9/1997 | Green et al. | 705/26 |
| 5,664,111 A | 9/1997 | Nahan et al. | 705/27 |
| 5,666,493 A | 9/1997 | Wojcik et al. | 705/26 |
| 5,671,279 A | 9/1997 | Elgamal | 705/79 |
| 5,694,551 A | 12/1997 | Doyle et al. | 705/26 |
| 5,710,887 A | 1/1998 | Chelliah et al. | 705/26 |
| 5,715,314 A | 2/1998 | Payne et al. | 705/78 |
| 5,721,832 A | 2/1998 | Westrope et al. | 705/27 |
| 5,724,540 A | 3/1998 | Kametani | 711/220 |
| 5,727,048 A | 3/1998 | Hiroshima et al. | 379/93.12 |
| 5,729,594 A | 3/1998 | Klingman | 379/93.12 |
| 5,742,768 A | 4/1998 | Gennaro et al. | 1/1 |
| 5,758,328 A | 5/1998 | Giovannoli | 705/26 |
| 5,774,729 A | 6/1998 | Carney et al. | 717/126 |
| 5,778,179 A | 7/1998 | Kanai et al. | 709/203 |
| 5,790,677 A | 8/1998 | Fox et al. | 705/78 |
| 5,794,207 A | 8/1998 | Walker et al. | 705/1 |
| 5,805,805 A | 9/1998 | Civanlar et al. | 709/220 |
| 5,809,144 A | 9/1998 | Sirbu et al. | 705/53 |
| 5,850,442 A | 12/1998 | Muftic | 705/65 |
| 5,961,582 A | 10/1999 | Gaines | 709/1 |
| 5,963,924 A | 10/1999 | Williams et al. | 705/40 |
| 5,982,773 A | 11/1999 | Nishimura et al. | 370/395.53 |
| 6,003,050 A | 12/1999 | Silver et al. | 715/536 |
| 6,009,413 A | 12/1999 | Webber et al. | 705/26 |
| 6,093,216 A | 7/2000 | Adl-Tabatabai et al. | 717/128 |
| 6,199,116 B1 | 3/2001 | May et al. | 709/310 |
| 6,216,158 B1 | 4/2001 | Luo et al. | 709/217 |
| 6,243,716 B1 | 6/2001 | Waldo et al. | 707/202 |
| 6,263,350 B1 | 7/2001 | Wollrath et al. | 707/206 |
| 6,343,308 B1 | 1/2002 | Marchesseault | 709/1 |
| 6,385,643 B1 | 5/2002 | Jacobs et al. | 709/203 |

OTHER PUBLICATIONS

Elliot Kolodner, Barbara Liskov, and William Weihl, "Automatic Garbage Collection: Managing a Stable Heap", ACM, 1989, pp. 15–25.*

Cary G. Gray and David R. Cheriton, "Leases; An Efficient Fault–Tolerant Mechanism for Distributed File Cache Consistency", ACM, 1989, pp. 201–210.*

"Consumers Can View, Share Picture On–Line as Kodak Picture Network Goes 'Live'," Business Wire, Aug. 25, 1997, pp. 18–19.

"ISN Dataweb Sells Software, Hardware," Datamation, Apr. 1, 1996, p. 40.

"Kodak DC220 And DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Presswire, Feb. 13, 1998, pp. 31–35.

"Kodak PhotoNet Online Makes It a Snap to Share Summer Photos," PR Newswire, Jul. 2, 1998, pp. 63–64.

"Kodak Picture Network Sends Prints Home From the Holidays," Business Wire, Dec. 29, 1997, pp. 58–60.

"Photo processing made easy on the Internet; Storm Software and PictureVision team up with Konica Corp.," Business Wire, Feb. 22, 1996, pp. 3–4.

"Seeing your photos a whole new way," Business Wire, Dec. 12, 1996, pp. 9–10.

"Webwatch: MCI Announces Internet Access,", Broadwatch Magazine, Jan. 1995.

Administrator's Guide, Netscape Enterprise Server, Version 3.0, Netscape Communications Corp., 1998.

Bandrowski, "Stores Without Doors: Kiosks Generate New Profits," Corporate Computing, Oct. 1992, pp. 193–195.

Bruno, "Working the Web," Data Communications, Apr. 1997, pp. 50–60.

Cohen, "Electronic Commerce," USC/Information Sciences Institute, Oct. 1989.

Conhaim, "Online shopping: a beginner's guide; includes related listing of videotex services," Link–Up, vol. 5, No. 6, p. 32, Nov. 1988.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1–6.

Ellsworth, "Boom Town," Internet World, Jun. 1995, pp. 33–35.

Estrin, "Inter–Organization Networks: Implications of Access Control Requirements for Interconnection Protocols," ACM, 1986, pp. 254–263.

Fleischer, "SkyMall's 'Supplier Network' Takes Flight", Retailtech, The Technology Magazine for Retail Executives, Apr. 1997.

Foley, "Managing Campus–Wide Information Systems: Issues and Problems," Capitalizing on Communication, ACM SIGUCCS XVII, 1989, pp. 169–174.

Fryxell, "eaasySABRE," Link–Up, May/Jun. 1996, pp. 10–11.

Gardner, "Kodak Follows Startup Into Online Photo Processing Business," Internet World, Sep. 8, 1997, pp. 5–6.

Gogan et al., "Open Market, Inc.: Managing in a Turbulent Environment," Harvard Business School Publishing, Aug. 29, 1996, pp. 1–30.

Israel et al., "Authentication in Office System Internetworks," ACM Transactions on Office Information Systems, vol. 1, No. 3, Jul. 1983, pp. 193–210.

Jacob, "The Use of Distributed Objects and Dynamic Interfaces in a Wide–Area Transaction Environment," SIGCOMMn '95 Workshop on Middleware: Cambridge, Mass., Aug. 1995, pp. 1–3.

Keller, "Smart Catalogs and Virtual Catalogs," Proceedings of the First USENIX Workshop of Electronic Commerce, USENIX Association, Jul. 11–12, 1995, pp. 125–131.

Klein et al., "Trade'ex: The Stock Exchange of the Computer Industry," Harvard Business School Publishing, 1996, pp. 1–14.

Kodak Photonet FAQ, PhotoNet Online, Jun. 14, 2002, pp. 1–3.

Kolodner et al., "Atomic Garbage Collection: Managing a Stable Heap," ACM, 1989, pp. 15–25.

Kon, Fabio, "Distributed File Systems Past, Present and Future A distributed File System for 2006," Mar. 6, 1996, pp. 1–12.

Kramer, "NETWATCH; The AJC's Daily Online Guide; Get the picture: Kodak will send photos to Web," The Atlanta Journal and Constitution, Sec. Features, p. 08C, Jun. 5, 1997.

Lampson et al., "Authentication in Distributed Systems: Theory and Practice," ACM Transactions n Computer Systems, vol. 10, No. 4, Nov. 1992, pp. 265–310.

Lansky, "Without APS, Photo Life Goes on Via Internet," Photgraphic Trade News, Aug. 1996, pp. 19–23.

Lewis, "Pacific Bell, MCI to Expand Internet Service," The New York Times, sec. D, col. 1 at 3, Mar. 28, 1995.

LightSurf Instant Imaging—Press Releases, "Kodak And LightSurf Collaborate On Kodak Picture Center Online," LifeSurf Technologies Inc., Jun. 14, 2002, pp. 1–3.

Louwerse et al., "Data Protection Aspects in an Integrated Hospital Information System," North–Holland Computers & Security 3, 1984, pp. 286–294.

McEnaney, "Point–and–Click Memory Sharing; Launches PhotoNet online digital photography and imaging services," Photographic Trade News, Sec. p. 23, Jan. 1997.

Miller, "Web posting as a photo processing option," USA Today, Section: Life, p. 17D, Dec. 13, 1996.

Morris et al., "Andrew: A Distributed Personal Computing Environment," Communications of the ACM, vol. 29, No. 3, Mar. 1986, pp. 184–201.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Petersen, "New But Not Improved," Direct Magazine, Nov. 1995.

Press Release, "Sun Goes Live With The Kodak Picture Network," Sun Microsystems, Inc., Jun. 14, 2002, pp. 1–2.

Raeder, "Is there a Prodigy in your future?," Database Searcher, vol. 5, No. 6, p. 18.

Ramm et al., "Exu—A System for Secure Delegation of Authority on an Insecure Network," Ninth System Administration Conference, 1995 LISA IX, Sep. 17–22, 1995, pp. 89–93.

Satyanarayanan, "Integrated Security in a Large Distributed System," ACM Transactions on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information Systems Management, Summer 1996, pp. 15–24.

Steinke, "Design Aspects of Access Control in a Knowledge Base System," Computers & Security, 10, 1991, pp. 612–625.

Stern, "Industry Net," Link–Up, Mar./Apr. 1995, p. 10.

Tanenbaum et al., "Distributed Operating Systems," Computing Surveys, vol. 17, No. 4, Dec. 1985, pp. 419–470.

The Wall Street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trommer, "Thomas Unveils Online Purchasing Network—Eases Product Sourcing And Ordering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Relational Database Environment," North–Holland Computers & Security 5, 1986, pp. 128–134.

Welz, "New Deals: A ripening Internet market, secure systems and digital currency are reshaping global commerce," Internet World, Jun. 1995, pp. 36–41.

Wobber et al., "Authentication in the Taos Operating System," ACM, 1993, pp. 256–269.

Wyatt, "Netscape Enterprise Server," Prima Publishing, 1996.

* cited by examiner

LEASE RENEWAL SERVICE

RELATED APPLICATIONS

This is a continuation of application Ser. No. 09/955,177, filed Sep. 19, 2001 U.S. Pat. No. 6,499,049, which is a continuation of application Ser. No. 09/691,104, filed Oct. 19, 2000 U.S. Pat. No. 6,449,648, which is a continuation of application Ser. No. 09/332,512, filed Jun. 14, 1999 U.S. Pat. No. 6,237,009, which is a continuation-in-part of application Ser. No. 09/152,062, filed Sep. 11, 1998 U.S. Pat. No. 6,314,425, which is a continuation-in-part of application Ser. No. 08/729,421, filed Oct. 11, 1996, now U.S. Pat. No. 5,832,529, all of which are incorporated herein by reference.

The following identified U.S. patent applications are relied upon and are incorporated by reference in this application.

U.S. patent application Ser. No. 09/044,923, entitled "Method and System for Leasing Storage," and filed on Mar. 20, 1998, which is a continuation-in-part of U.S. patent application Ser. No. 08/729,421, filed Oct. 11, 1996, incorporated by reference.

U.S. patent application Ser. No. 09/044,838, entitled "Method, Apparatus, and Product for Leasing of Delegation Certificates in a Distributed System," and filed on Mar. 20, 1998, which is a continuation-in-pad of U.S. application Ser. No. 08/729,421, filed on Oct. 11, 1996, incorporated herein by reference.

U.S. patent application Ser. No. 09/044,834, entitled "Method, Apparatus and Product for Leasing of Group Membership in a Distributed System," and filed on Mar. 20, 1998, which is a continuation-in-part of U.S. patent application Ser. No. 08/729,421, filed Oct. 11, 1996, incorporated by reference.

U.S. patent application Ser. No. 09/044,926, entitled "Leasing for Failure Detection," and filed on Mar. 20, 1998, which is a continuation-in-pad of U.S. patent application Ser. No. 08/729,421, filed Oct. 11, 1996, incorporated by reference.

U.S. patent application Ser. No. 09/044,933, entitled "Method for Transporting Behavior in Event Based System," and filed on Mar. 20, 1998.

U.S. patent application Ser. No. 09/044,919, entitled "Deferred Reconstruction of Objects and Remote Loading for Event Notification in a Distributed System," and filed on Mar. 20, 1998.

U.S. patent application Ser. No. 09/044,938, entitled "Methods and Apparatus for Remote Method Invocation," and filed on Mar. 20, 1998.

U.S. patent application Ser. No. 09/045,652, entitled "Method and System for Deterministic Hashes to Identify Remote Methods," and filed on Mar. 20, 1998.

U.S. patent application Ser. No. 09/044,790, entitled "Method and Apparatus for Determining Status of Remote Objects in a Distributed System," and filed on Mar. 20, 1998.

U.S. patent application Ser. No. 09/044,930, entitled "Downloadable Smart Proxies for Performing Processing Associated with a Remote Procedure Call in a Distributed System," and filed on Mar. 20, 1998.

U.S. patent application Ser. No. 09/044,917, entitled "Suspension and Continuation of Remote Methods," and filed on Mar. 20, 1998.

U.S. patent application Ser. No. 09/044,835, entitled "Method and System for Multi-Entry and Multi-Template Matching in a Database," and filed on Mar. 20, 1998.

U.S. patent application Ser. No. 09/044,839, entitled "Method and System for In-Place Modifications in a Database," and filed on Mar. 20, 1998.

U.S. patent application Ser. No. 09/044,945, entitled "Method and System for Typesafe Attribute Matching in a Database," and filed on Mar. 20, 1998.

U.S. patent application Ser. No. 09/044,931, entitled "Dynamic Lookup Service in a Distributed System," and filed on Mar. 20, 1998.

U.S. patent application Ser. No. 09/044,939, entitled "Apparatus and Method for Providing Downloadable Code for Use in Communicating with a Device in a Distributed System," and filed on Mar. 20, 1998.

U.S. patent application Ser. No. 09/044,826, entitled "Method and System for Facilitating Access to a Lookup Service," and filed on Mar. 20, 1998.

U.S. patent application Ser. No. 09/044,932, entitled "Apparatus and Method for Dynamically Verifying Information in a Distributed System," and filed on Mar. 20, 1998.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," and filed on Mar. 20, 1998.

U.S. patent application Ser. No. 09/044,934, entitled "Polymorphic Token-Based Control," and filed on Mar. 20, 1998.

U.S. patent application Ser. No. 09/044,915, entitled "Stack-Based Access Control," and filed on Mar. 20, 1998.

U.S. patent application Ser. No. 09/044,944, entitled "Stack-Based Security Requirements," and filed on Mar. 20, 1998.

U.S. patent application Ser. No. 09/044,837, entitled "Per-Method Designation of Security Requirements," and filed on Mar. 20, 1998.

BACKGROUND OF THE INVENTION

A. Field of the Invention

This invention generally relates to data processing systems and, more particularly, to a lease renewal service.

B. Description of the Related Art

Proper resource management is an important aspect to efficient and effective use of computers. In general, resource management involves allocating resources (e.g., memory) in response to requests as well as deallocating resources at appropriate times, for example, when the requesters no longer require the resources. In general, the resources contain data referenced by computational entities (e.g., applications, programs, applets, etc.) executing in the computers.

In practice, when applications executing on computers seek to refer to resources, the computers must first allocate or designate resources so that the applications can properly refer to them. When the applications no longer refer to a resource, the computers can deallocate or reclaim the resource for reuse. In computers each resource has a unique "handle" by which the resource can be referenced. The handle may be implemented in various ways, such as an address, array index, unique value, pointer, etc.

Resource management is relatively simple for a single computer because the events indicating when resources can be reclaimed, such as when applications no longer refer to them or after a power failure, are easy to determine. Resource management for distributed systems connecting multiple computers is more difficult because applications in several different computers may be using the same resource.

Disconnects in distributed systems can lead to the improper and premature reclamation of resources or to the failure to reclaim resources. For example, multiple applications operating on different computers in a distributed system may refer to resources located on other machines. If connections between the computers on which resources are located and the applications referring to those resources are interrupted, then the computers may reclaim the resources prematurely. Alternatively, the computers may maintain the resources in perpetuity, despite the extended period of time that applications failed to access the resources.

These difficulties have led to the development of systems to manage network resources, one of which is known as "distributed garbage collection."That term describes a facility provided by a language or runtime system for distributed systems that automatically manages resources used by an application or group of applications running on different computers in a network.

In general, garbage collection uses the notion that resources can be freed for future use when they are no longer referenced by any part of an application. Distributed garbage collection extends this notion to the realm of distributed computing, reclaiming resources when no application on any computer refers to them.

Distributed garbage collection must maintain integrity between allocated resources and the references to those resources. In other words, the system must not be permitted to deallocate or free a resource when an application running on any computer in the network continues to refer to that resource. This reference-to-resource binding, referred to as "referential integrity," does not guarantee that the reference will always grant access to the resource to which it refers. For example, network failures can make such access impossible. The integrity, however, guarantees that if the reference can be used to gain access to any resource, it will be the same resource to which the reference was first given.

Distributed systems using garbage collection must also reclaim resources no longer being referenced at some time in the finite future. In other words, the system must provide a guarantee against "memory leaks." A memory leak can occur when all applications drop references to a resource, but the system fails to reclaim the resource for reuse because, for example, of an incorrect determination that some application still refers to the resource.

Referential integrity failures and memory leaks often result from disconnections between applications referencing the resources and the garbage collection system managing the allocation and deallocation of those resources. For example, a disconnection in a network connection between an application referring to a resource and a garbage collection system managing that resource may prevent the garbage collection system from determining whether and when to reclaim the resource. Alternatively, the garbage collection system might mistakenly determine that, since an application has not accessed a resource within a predetermined time, it may collect that resource. A number of techniques have been used to improve the distributed garbage collection mechanism by attempting to ensure that such mechanisms maintain referential integrity without memory leaks. One conventional approach uses a form of reference counting, in which a count is maintained of the number of applications referring to each resource. When a resource's count goes to zero, the garbage collection system may reclaim the resource. Such a reference counting scheme only works, however, if the resource is created with a corresponding reference counter. The garbage collection system in this case increments the resource's reference count as additional applications refer to the resource, and decrements the count when an application no longer refers to the resource.

Reference counting schemes, however, especially encounter problems in the face of failures that can occur in distributed systems. Such failures can take the form of a computer or application failure or network failure that prevent the delivery of messages notifying the garbage collection system that a resource is no longer being referenced. If messages go undelivered because of a network disconnect, the garbage collection system does not know when to reclaim the resource.

To prevent such failures, some conventional reference counting schemes include "keep-alive" messages, which are also referred to as "ping back."According to this scheme, applications in the network send messages to the garbage collection system overseeing resources and indicate that the applications can still communicate. These messages prevent the garbage collection system from dropping references to resources. Failure to receive such a "keep-alive" message indicates that the garbage collection system can decrement the reference count for a resource and, thus, when the count reaches zero, the garbage collection system may reclaim the resource. This, however, can still result in the premature reclamation of resources following reference counts reaching zero from a failure to receive "keep-alive" messages because of network failures. This violates the referential integrity requirement.

Another proposed method for resolving referential integrity problems in garbage collection systems is to maintain not only a reference count but also an identifier corresponding to each computational entity referring to a resource. See A. Birrell, et al., "Distributed Garbage Collection for Network Objects," No. 116, digital Systems Research Center, Dec. 15, 1993. This method suffers from the same problems as the reference counting schemes. Further, this method requires the addition of unique identifiers for each computational entity referring to each resource, adding overhead that would unnecessarily increase communication within distributed systems and add storage requirements (i.e., the list of identifiers corresponding to applications referring to each resource).

SUMMARY OF THE INVENTION

In accordance with the present invention, referential integrity is guaranteed without costly memory leaks by leasing resources for a period of time during which the parties in a distributed system, for example, an application holding a reference to a resource and the garbage collection system managing that resource, agree that the resource and a reference to that resource will be guaranteed. At the end of the lease period, the guarantee that the reference to the resource will continue lapses, allowing the garbage collection system to reclaim the resource. Because the application holding the reference to the resource and the garbage collection system managing the resource agree to a finite guaranteed lease period, both can know when the lease and, therefore, the guarantee, expires. This guarantees referential integrity for the duration of a reference lease and avoids the concern of failing to free the resource because of network errors.

In accordance with the present invention, as embodied and broadly described herein, a method for managing resources comprises the steps of receiving a request from a process referring to a resource and specifying a requested lease period, permitting shared access to the resource for a granted lease period, advising the process of the granted lease period, and deallocating the resource when the granted lease period expires. In accordance with another aspect of the present invention, as embodied and broadly described herein, a method for managing resources comprises the steps of requesting from a process access to a resource for a lease period, receiving from the process a granted lease period during which shared access to the resource is permitted, and sending a request to the process for a new lease period upon a determination that the granted lease period is about to expire but access to the resource has not completed.

In accordance with the present invention, as embodied and broadly described herein, an apparatus comprises a receiving module configured to receive a request from a process referring to a resource and specifying a requested lease period, a resource allocator configured to permit shared access to the resource for a granted lease period, an advising module configured to advise the process of the granted lease period, and a resource deallocator configured to deallocate the resource when the granted lease period expires. In accordance with another aspect of the present invention, as embodied and broadly described herein, an apparatus comprises a requesting module configured to request from a process access to a resource for a lease period, a receiving module configured to receive from the process a granted lease period during which shared access to the resource is permitted, and a second sending module configured to send another request to the process for a new lease period upon a determination that the granted lease period is about to expire but access to the resource has not completed.

In accordance with yet another aspect of the present invention, as embodied and broadly described herein, a computer program product comprises a computer usable medium having computable readable code embodied therein for managing resources. The code comprises a receiving module configured to receive a request from a process referring to a resource and specifying a requested lease period, a resource allocator configured to permit shared access to the resource for a granted lease period, an advising module configured to advise of the granted lease period, and a resource deallocator configured to deallocate the resource when the granted lease period expires. In accordance with another aspect of the present invention, as embodied and broadly described herein, a computer program product comprises a computer usable medium having computable readable code embodied therein for managing resources. The code comprises a requesting module configured to request from a process access to a resource for a lease period, a receiving module configured to receive from the process a granted lease period during which the process permits shared access to the resource, and a sending module configured to send another request to the process for a new lease period upon a determination that the granted lease period is about to expire.

In accordance with an alternative embodiment of the present invention, as embodied and broadly described herein, a method for managing leases between clients and network services comprises the steps of receiving from the client an indication of a lease on the network service, and managing the lease on behalf of the client.

In accordance with another aspect of the alternative embodiment of the present invention, as embodied and broadly described herein, a method for managing leases between clients and network services comprises the steps of receiving from the client an indication of a lease on a network service, specifying a duration for managing the lease on behalf of the client, and managing the lease for the specified duration.

In accordance with an alternative embodiment of the present invention, as embodied and broadly described herein, an apparatus is provided that comprises a memory containing a lease manager that manages leases with network services, a client that has a lease with a network service and sends a request to the lease manager to manage the lease on behalf of the client, and at least one processor for running the lease manager and the client.

In accordance with an alternative embodiment of the present invention, as embodied and broadly described herein, a computer-readable memory device is provided, containing an interface data structure used for accessing a lease manager that includes a method for use by a client with a pre-existing lease to enter into a lease with the lease manager that manages the pre-existing lease on behalf of the client.

In accordance with an alternative embodiment of the present invention, as embodied and broadly described herein, a computer-readable medium is provided, containing instructions for controlling a data processing system to perform a method for managing a lease between a client and a network service. The method comprises the steps of receiving from a client an indication of a lease on a network service, and managing the lease on behalf of the client.

In accordance with an alternative embodiment of the present invention, as embodied and broadly and described herein, a computer-readable medium is provided, containing instructions for controlling a data processing system to perform a method for managing a lease between a client and a network service. The method comprises the steps of receiving from the client an indication of a lease on the network service, specifying a duration for managing the lease on behalf of the client, and managing the lease for the specified duration.

In accordance with an alternative embodiment of the present invention, as embodied and broadly and described herein, a method for managing leases in a data processing system includes the steps of a client obtaining a lease on the network service, sending a request to the lease manager to manage the lease on behalf of the client for a specified period of time, and receiving an indication from the lease manager when the specified period of time is near expiration.

In accordance with an alternative embodiment of the present invention, as embodied and broadly and described herein, a method for managing leases in a data processing system includes the steps of a client obtaining a lease on a resource, sending a request to the lease manager to manage the lease on behalf of the client, and receiving an indication from the lease manager when the lease is near expiration.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by computers organized in a conventional distributed processing system architecture. The architecture for and procedures to implement this invention, however, are not conventional, because they provide a distributed garbage collection scheme that ensures referential integrity and eliminates memory leaks.

A. Overview

A method invocation (MI) component located in each of the computers in the distributed processing system implements the distributed garbage collection scheme of this invention. The MI component may consist of a number of software modules preferably written in the JAVA™ programming language.

In general, whenever an application in the distributed processing system obtains a reference to a distributed resource, by a name lookup, as a return value to some other call, or another method, and seeks to access the resource, the application makes a call to the resource or to an MI component managing the resource. That MI component, called a managing MI component, keeps track of the number of outstanding references to the resource. When the number of references to a reference is zero, the managing MI component can reclaim the resource. The count of the number of references to a resource is generally called the "reference count" and the call that increments the reference count may be referred to as a "dirty call."

When an application no longer requires a distributed resource, it sends a different call to the resource or the managing MI component. Upon receipt of this call, the managing MI component decrements the reference count for the resource. This call to drop a reference may be referred to as a "clean call."

In accordance with an implementation of the present invention, a dirty call can include a requested time interval, called a lease period, for the reference to the resource. Upon receipt of the dirty call, the managing MI component sends a return call indicating a period for which the lease was granted. The managing MI component thus tracks the lease period for those references as well as the number of outstanding references. Consequently, when the reference count for a resource goes to zero or when the lease period for the resource expires, the managing MI component can reclaim the resource.

B. Procedure

Figure 1:
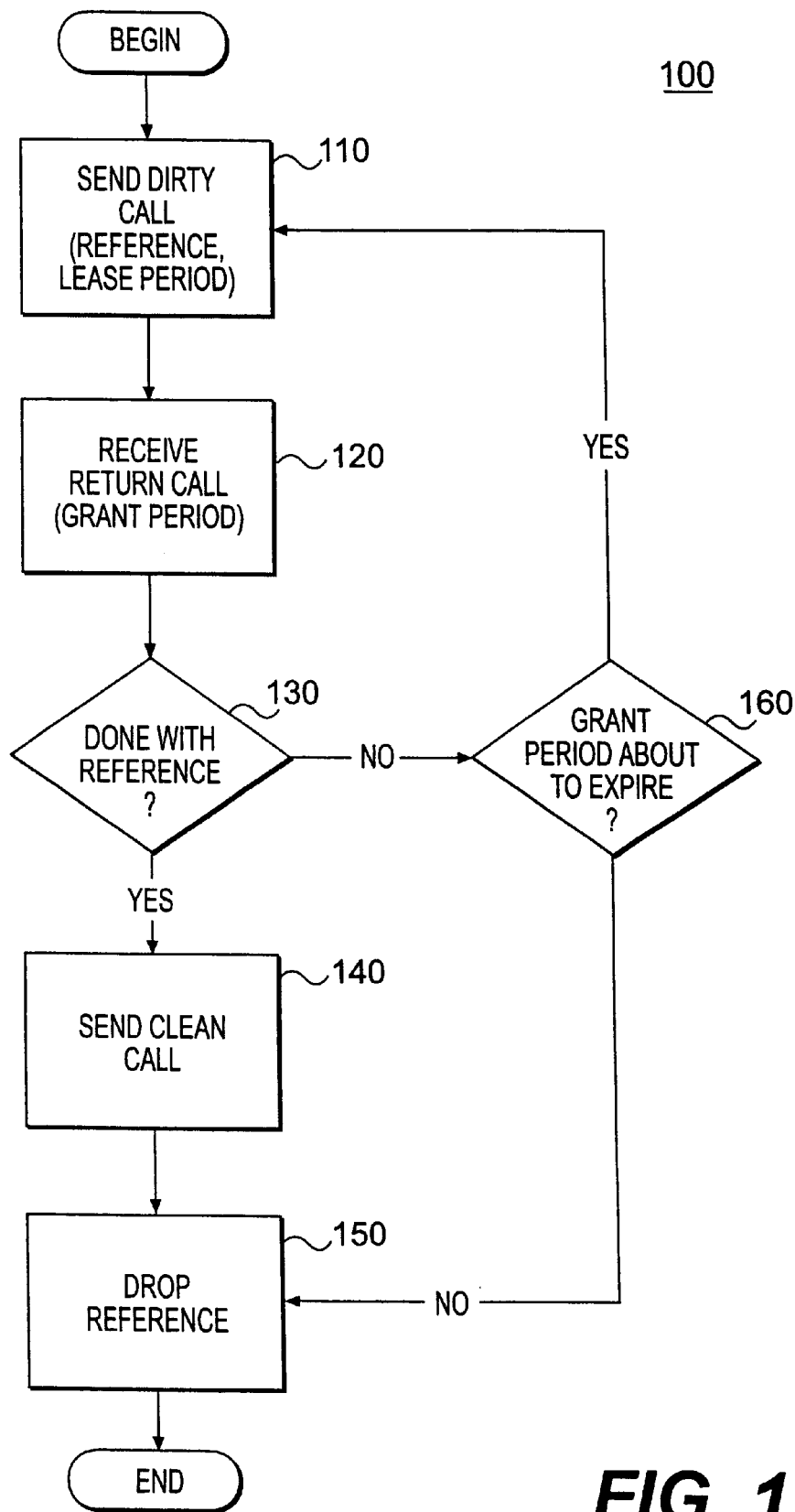
FIG. 1 is a flow diagram of the steps performed by the application call processor according to an implementation of the present invention.

An application call processor in an MI component performs the steps of the application call procedure 100 illustrated in FIG. 1. The server call processor in the managing MI component performs the steps of the procedures 200, 300, and 400 illustrated in FIGS. 2–4, respectively. The managing MI component's garbage collector performs conventional procedures to reclaim resources previously bound to references in accordance with instructions from the server call processor. Accordingly, the conventional procedures of the garbage collector will not be explained.

1. Application Call Processor

FIG. 1 is a flow diagram of the procedure 100 that the application call processor of the MI component uses to handle application requests for references to resources managed by the same or another MI component located in the distributed processing system.

After an application has obtained a reference to a resource, the application call processor sends a dirty call, including the resource's reference and a requested lease period to the managing MI component for the resource (step 110). The dirty call may be directed to the resource itself or to the managing MI component.

The application call processor then waits for and receives a return call from the managing MI component (step 120). The return call includes a granted lease period during which the managing MI component guarantees that the reference of the dirty call will be bound to its resource. In other words, the managing MI component agrees not to collect the resource corresponding to the reference of a dirty call for the grant period. If the managing MI component does not provide a grant period, or rejects the request for a lease, then the application call processor will have to send another dirty call until it receives a grant period.

The application call processor monitors the application's use of the reference and, either when the application explicitly informs the application call processor that the reference is no longer required or when the application call processor makes this determination on its own (step 130), the application call processor sends a clean call to the managing MI component (step 140). In a manner similar to the method used for dirty calls, the clean call may be directed to the referenced resource and the managing MI component will process the clean call. Subsequently, the application call processor eliminates the reference from a list of references being used by the application (step 150).

If the application is not yet done with the reference (step 130), but the application call processor determines that the grant period for the reference is about to expire (step 160), then the application call processor repeats steps 110 and 120 to ensure that the reference to the resource is maintained by the managing MI component on behalf of the application.

2. Server Call Processor

The MI component's server call processor performs three main procedures: (1) handling dirty calls; (2) handling incoming clean calls; and (3) initiating a garbage collection cycle to reclaim resources at the appropriate time.

(I) Dirty Calls

Figure 2:
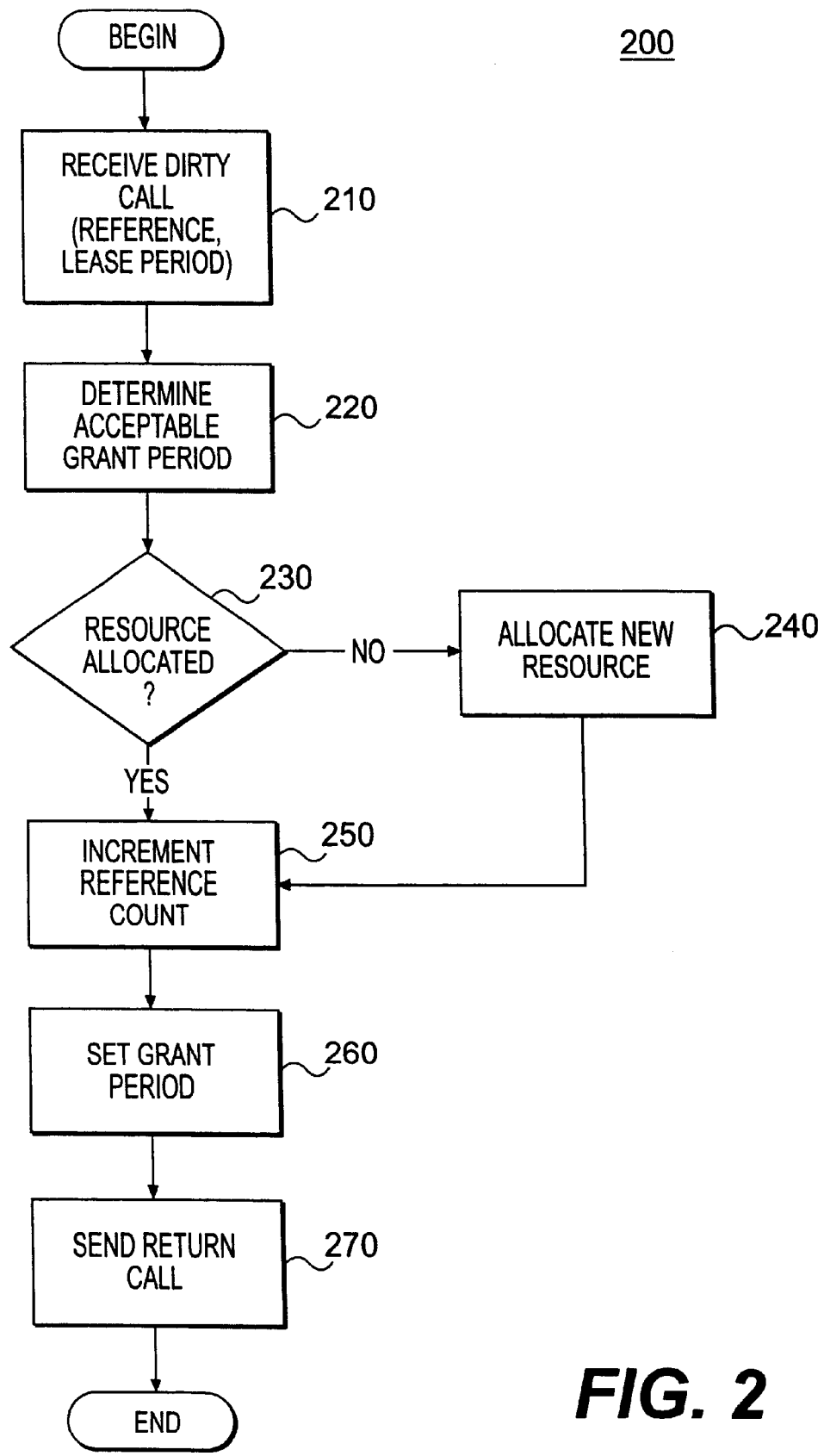
FIG. 2 is a flow diagram of the steps performed by the server call processor to process dirty calls according to the implementation of the present invention.

FIG. 2 is a flow diagram of the procedure 200 that the MI component's server call processor uses to handle requests to reference resources, i.e., dirty calls, that the MI software component manages. These requests come from application call processors of MI components in the distributed processing system, including the application call processor of the same MI component as the server call processor handling requests.

First, the server call processor receives a dirty call (step 210). The server call processor then determines an acceptable grant period (step 220). The grant period may be the same as the requested lease period or some other time period. The server call processor determines the appropriate grant period based on a number of conditions including the amount of resource required and the number of other grant periods previously granted for the same resource.

When the server call processor determines that a resource has not yet been allocated for the reference of a dirty call (step 230), the server call processor allocates the required resource (step 240).

The server call processor then increments a reference count corresponding to the reference of a dirty call (step 250), sets the acceptable grant period for the reference-to-resource binding (step 260), and sends a return call to an application call processor with the grant period (step 270). In this way, the server call processor controls incoming dirty calls regarding references to resources under its control.

Applications can extend leases by sending dirty calls with an extension request before current leases expire. As shown in procedure 200, a request to extend a lease is treated just like an initial request for a lease. An extension simply means that the resource will not be reclaimed for some additional interval of time, unless the reference count goes to zero.

(ii) Clean Calls

Figure 3:
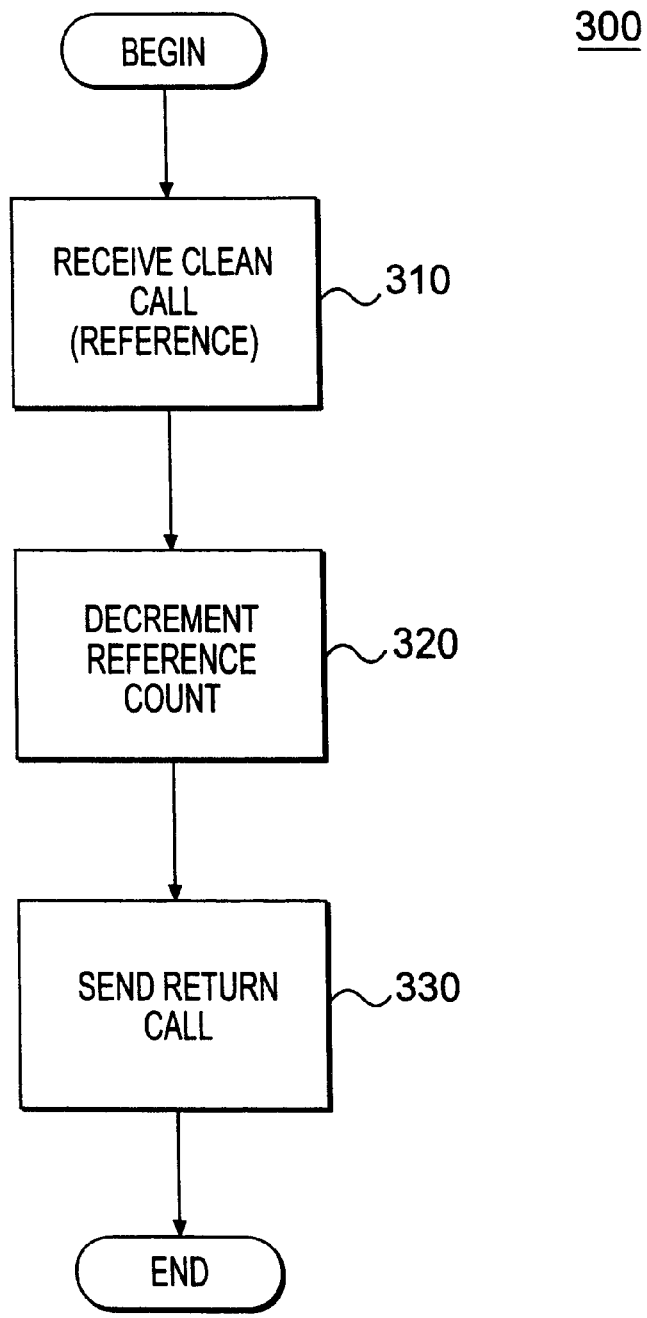
FIG. 3 is a flow diagram of the steps performed by the server call processor to process clean calls according to the implementation of the present invention.
Figure 4:
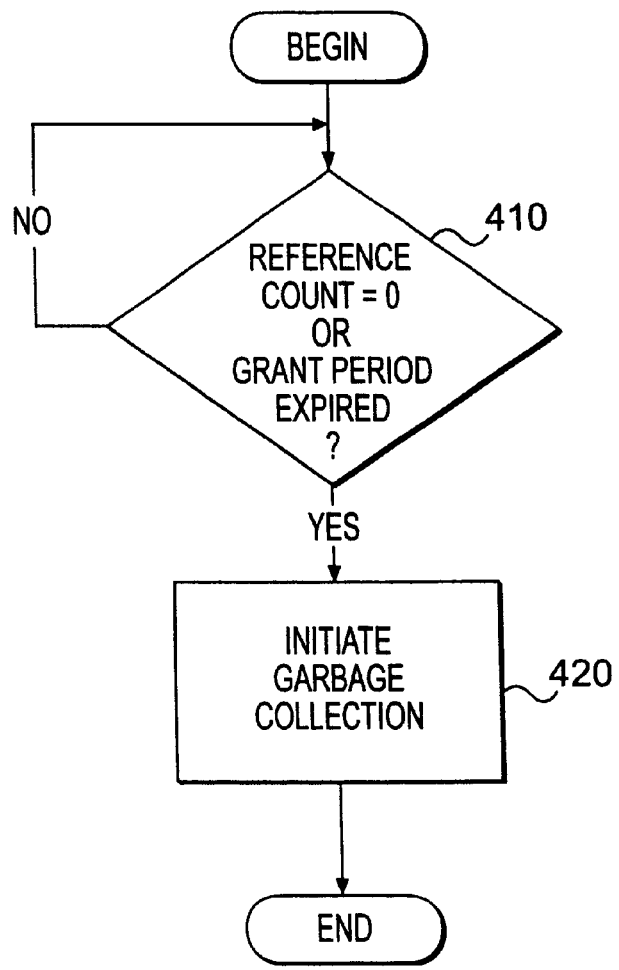
FIG. 4 is a flow diagram of the steps performed by the server call processor to initiate a garbage collection process according to the implementation of the present invention.

The MI component's server call processor also handles incoming clean calls from application call processors. When an application in the distributed processing system no longer requires a reference to a resource, it informs the MI component managing the resource for that reference so that the resource may be reclaimed for reuse. FIG. 3 is a flow diagram of the procedure 300 with the steps that the MI component's server call processor uses to handle clean calls.

When the server call processor receives a clean call with a reference to a resource that the MI component manages (step 310), the server call processor decrements a corresponding reference count (step 320). The clean call may be sent to the resource, with the server call processor monitoring the resource and executing the procedure 300 to process the call. Subsequently, the server call processor sends a return call to the MI component that sent the clean call to acknowledge receipt (step 330). In accordance with this implementation of the present invention, a clean call to drop a reference may not be refused, but it must be acknowledged.

(iii) Garbage Collection

The server call processor also initiates a garbage collection cycle to reclaim resources for which it determines that either no more references are being made to the resource or that the agreed lease period for the resource has expired. The procedure 400 shown in FIG. 4 includes a flow diagram of the steps that the server call processor uses to initiate a garbage collection cycle.

The server call processor monitors reference counts and granted lease periods and determines whether a reference count is zero for a resource managed by the MI component, or the grant period for a reference has expired (step 410).

When either condition exists, the server call processor initiates garbage collection (step 420) of that resource. Otherwise, the server call processor continues monitoring the reference counts and granted lease periods.

C. Call Flow

Figure 5:
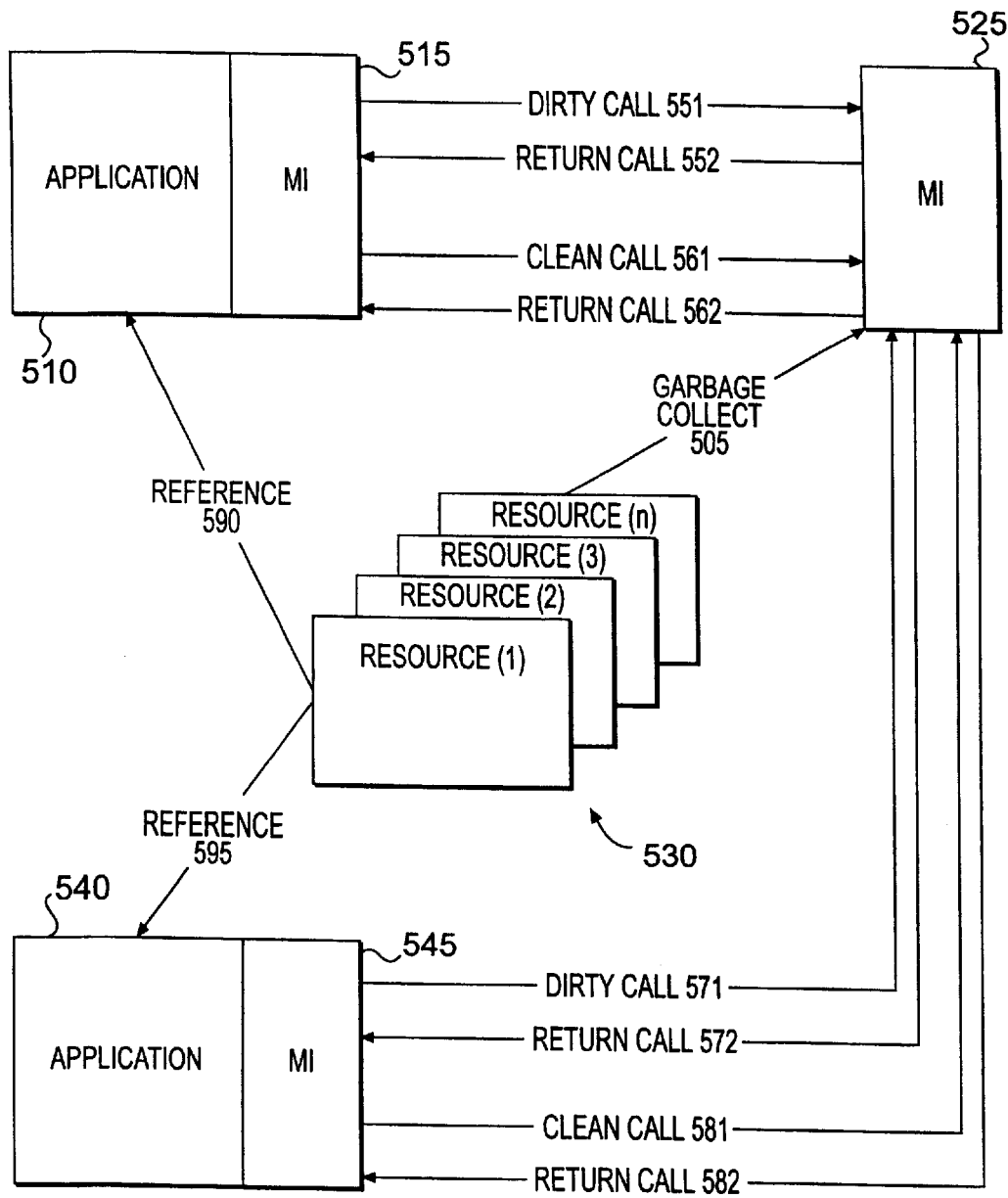
FIG. 5 is a diagram of a preferred flow of calls within a distributed processing system.

FIG. 5 is a diagram illustrating the flow of calls among MI components within the distributed processing system. Managing MI component 525 manages the resources 530 by monitoring the references to those resources 530 (see garbage collect 505). Because the managing MI components 525 manages the resources, the server call processor of managing MI component 525 performs the operations of this call flow description.

FIG. 5 also shows that applications 510 and 540 have corresponding MI components 515 and 545, respectively. Each of the applications 510 and 540 obtains a reference to one of the resources 530 and seeks to obtain access to one of the resources 530 such that a reference is bound to the corresponding resource. To obtain access, applications 510 and 540 invoke their corresponding MI components 515 and 545, respectively, to send dirty calls 551 and 571, respectively, to the MI component 525. Because the MI components 515 and 525 handle application requests for access to resources 530 managed by another MI component, such as managing MI component 525, the application call processors of MI components 515 and 545 perform the operations of this call flow description.

In response to the dirty calls 551 and 571, managing MI component 525 sends return calls 552 and 572, respectively, to each of the MI components 515 and 545, respectively. The dirty calls include granted lease periods for the references of the dirty calls 551 and 571.

Similarly, FIG. 5 also shows MI components 515 and 545 sending clean calls 561 and 581, respectively, to managing MI component 525. Clean calls 561 and 581 inform managing Ml component 525 that applications 510 and 540, respectively, no longer require access to the resource specified in the clean calls 561 and 581. Managing MI component 525 responds to clean calls 561 and 581 with return calls 562 and 582, respectively. Return calls 562 and 582 differ from return calls 552 and 572 in that return calls 562 and 582 are simply acknowledgments from MI component 525 of the received clean calls 561 and 581.

Both applications 510 and 540 may request access to the same resource. For example, application 510 may request access to "RESOURCE(1)" while application 540 was previously granted access to that resource. MI component 525 handles this situation by making the resource available to both applications 510 and 540 for agreed lease periods. Thus, MI component 525 will not initiate a garbage collection cycle to reclaim the "RESOURCE(1)" until either applications 510 and 540 have both dropped their references to that resource or the latest agreed periods has expired, whichever event occurs first.

By permitting more than one application to access the same resource simultaneously, the present invention also permits an application to access a resource after it sent a clean call to the managing MI component dropping the reference to the resource. This occurs because the resource is still referenced by another application or the reference's lease has not yet expired so the managing MI component 525 has not yet reclaimed the resource. The resource, however, will be reclaimed after a finite period, either when no more applications have leases or when the last lease expires.

D. MI Components

Figure 6:
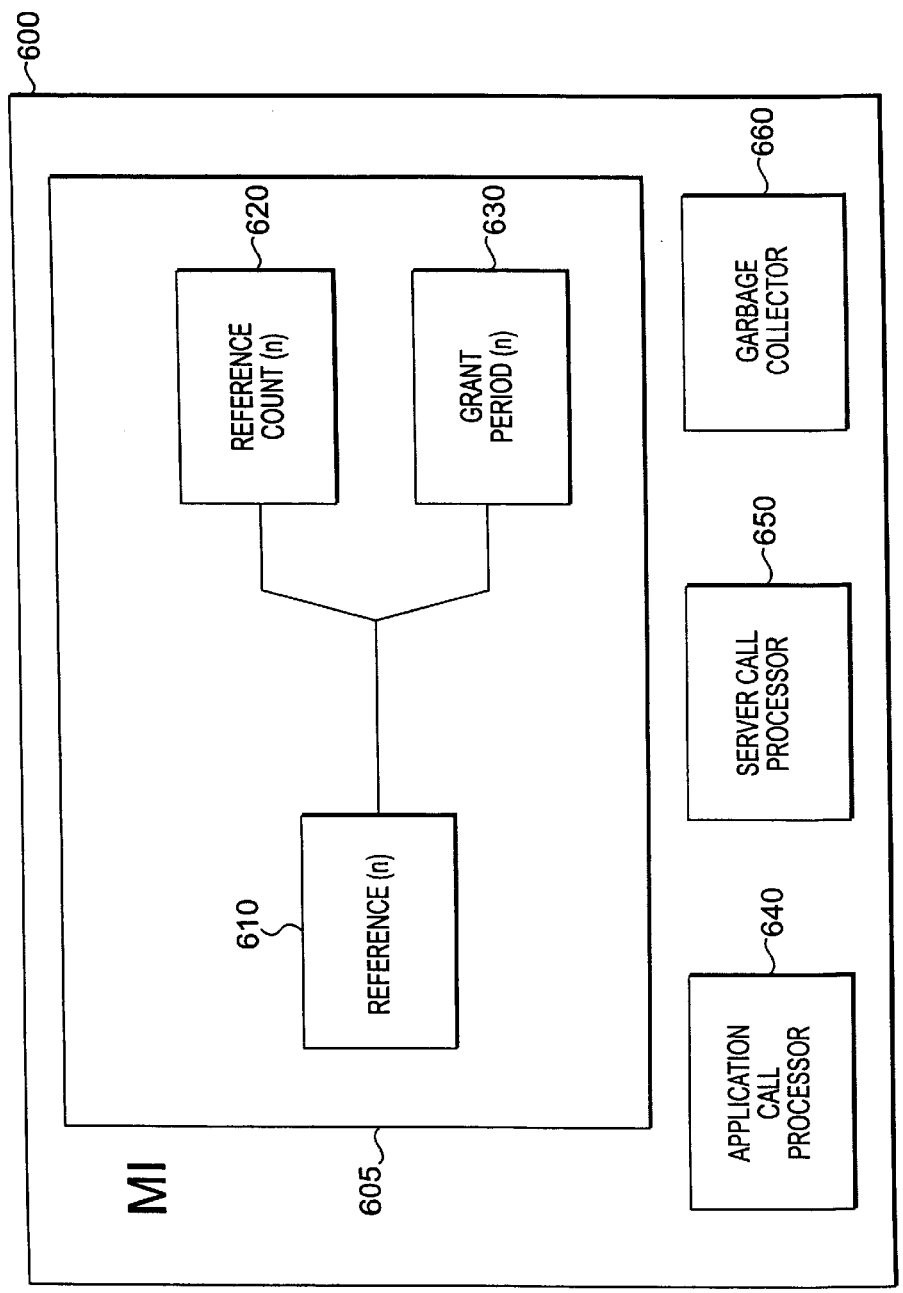
FIG. 6 is a block diagram of the components of the implementation of a method invocation service according to the present invention.

FIG. 6 is a block diagram of the modules of an MI component 600 according to an implementation of the present invention. MI component 600 can include a reference component 605 for each reference monitored, application call processor 640, server call processor 650, and garbage collector 660.

Reference component 605 preferably constitutes a table or comparable structure with reference data portions 610, reference count 620, and grant period register 630. MI component 600 uses the reference count 620 and grant period 630 for each reference specified in a corresponding reference data portion 610 to determine when to initiate garbage collector 660 to reclaim the corresponding resource.

Application call processor 640 is the software module that performs the steps of procedure 100 in FIG. 1. Server call processor 650 is the software module that performs the steps of procedures 200, 300, and 400 in FIGS. 2–4. Garbage collector 660 is the software module that reclaims resources in response to instructions from the server call processor 650, as explained above.

E. Distributed Processing System

Figure 7:
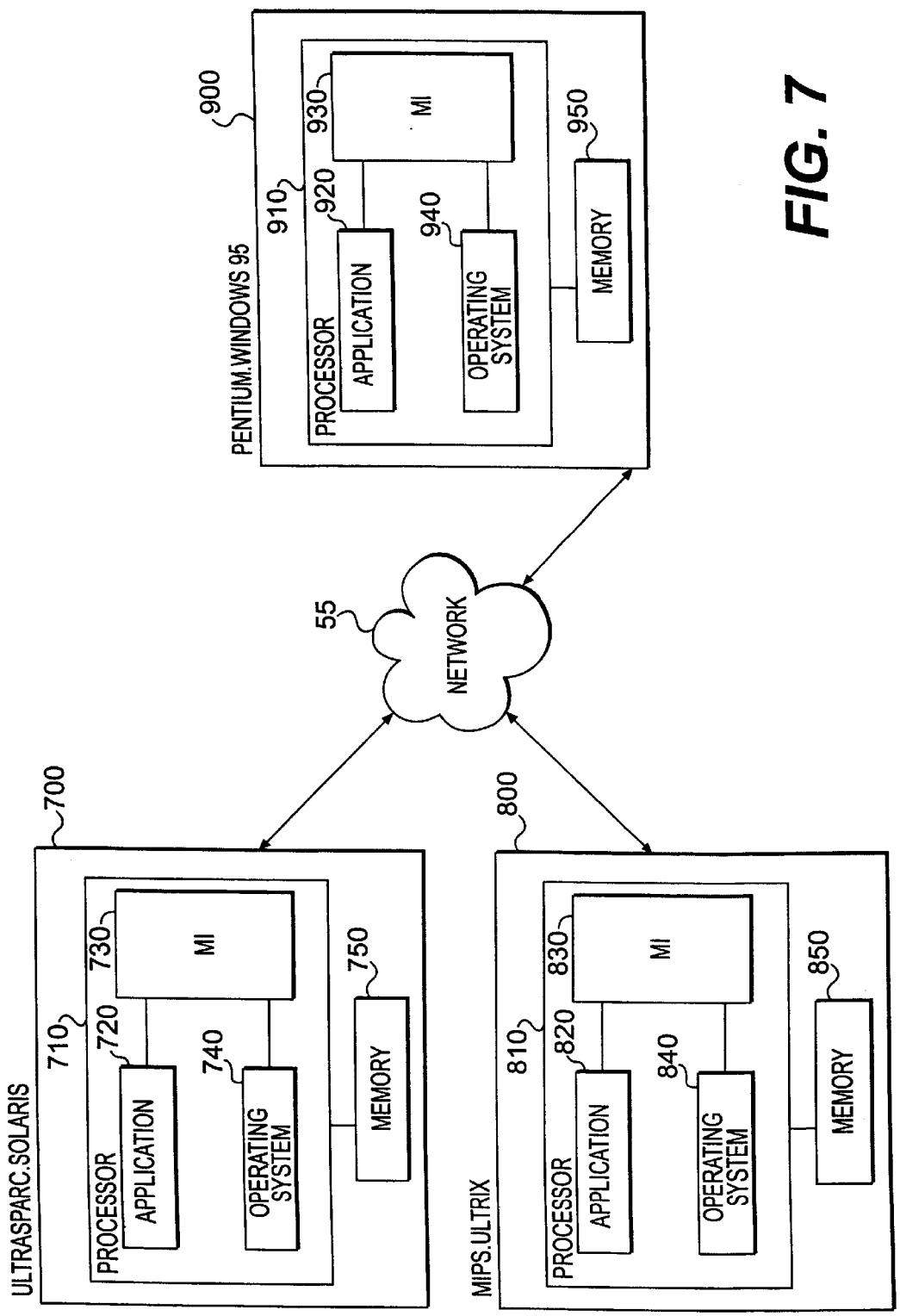
FIG. 7 is a diagram of a distributed processing system that can be used in an implementation of the present invention.

FIG. 7 illustrates a distributed processing system 50 which can be used to implement the present invention. In FIG. 7, distributed processing system 50 contains three independent and heterogeneous platforms 100, 200, and 300 connected in a network configuration represented by the network cloud 55. The composition and protocol of the network configuration represented in FIG. 7 by the cloud 55 is not important as long as it allows for communication of the information between platforms 700, 800 and 900. In addition, the use of just three platforms is merely for illustration and does not limit the present invention to the use of a particular number of platforms. Further, the specific network architecture is not crucial to this invention. For example, another network architecture that could be used in accordance with this invention would employ one platform as a network controller to which all the other platforms would be connected.

In the implementation of distributed processing system 50, platforms 700, 800 and 900 each include a processor 710, 810, and 910 respectively, and a memory, 750, 850, and 950, respectively. Included within each processor 710, 810, and 910, are applications 720, 820, and 920, respectively, operating systems 740, 840, and 940, respectively, and MI components 730, 830, and 930, respectively.

Applications 720, 820, and 920 can be programs that are either previously written and modified to work with the present invention, or that are specially written to take advantage of the services offered by the present invention. Applications 720, 820, and 920 invoke operations to be performed in accordance with this invention.

MI components 730, 830, and 930 correspond to the MI component 600 discussed above with reference to FIG. 6.

Operating systems 740, 840, and 940 are standard operating systems tied to the corresponding processors 710, 810, and 910, respectively. The platforms 700, 800, and 900 can be heterogenous. For example, platform 700 has an UltraSparc® microprocessor manufactured by Sun Microsystems Corp. as processor 710 and uses a Solaris® operating system 740. Platform 800 has a MIPS microprocessor manufactured by Silicon Graphics Corp. as processor 810 and uses a Unix operating system 840. Finally, platform 900 has a Pentium microprocessor manufactured by Intel Corp. as processor 910 and uses a Microsoft Windows 95 operating system 940. The present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 750, 850, and 950 serve several functions, such as general storage for the associated platform. Another function is to store applications 720, 820, and 920, MI components 730, 830, and 930, and operating systems 740, 840, and 940 before execution by the respective processor 710, 810, and 910. In addition, portions of memories 750, 850, and 950 may constitute shared memory available to all of the platforms 700, 800, and 900 in network 50.

E. MI Services

The present invention may be implemented using a client/server model. The client generates requests, such as the dirty calls and clean calls, and the server responds to requests.

Figure 8:
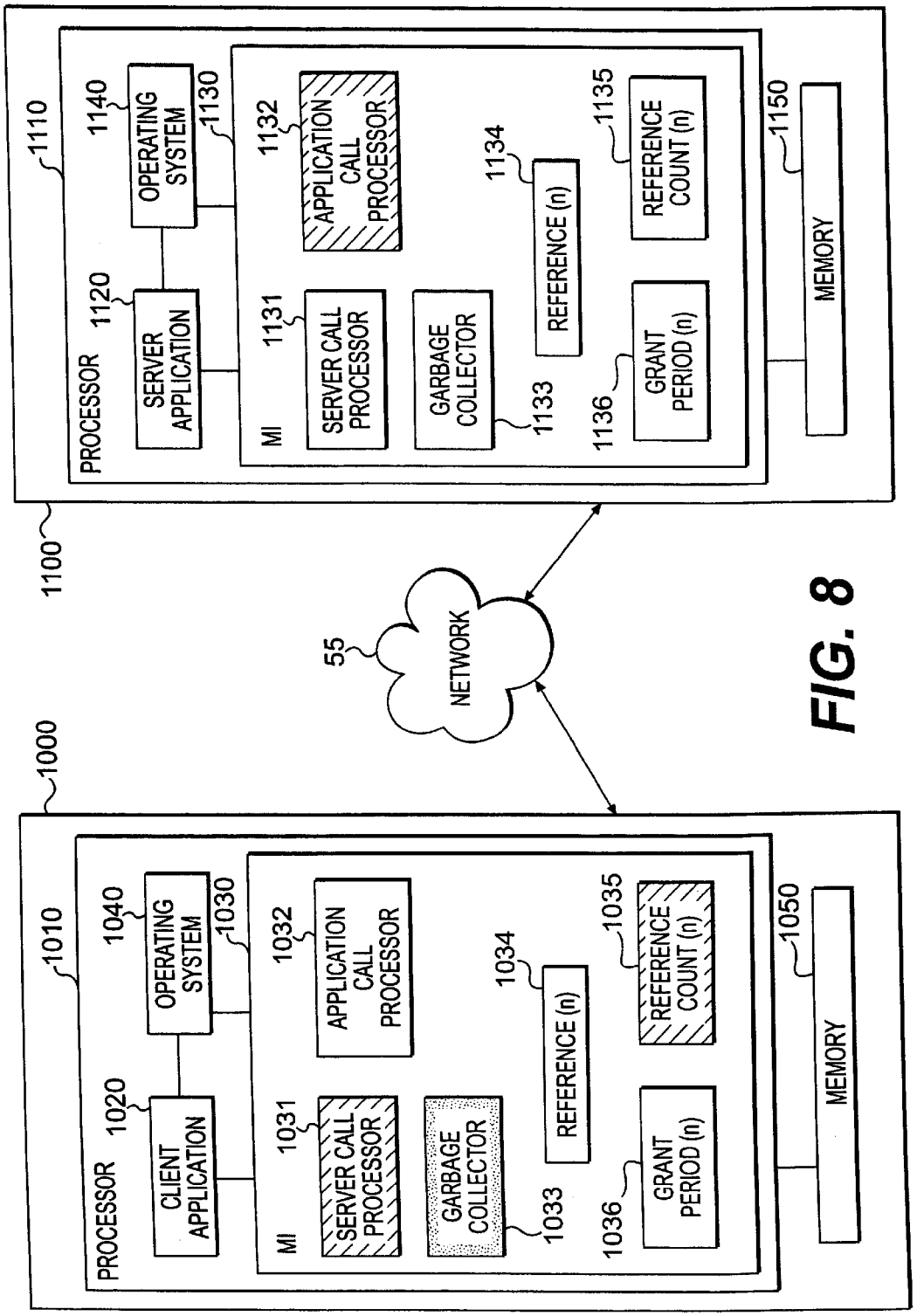
FIG. 8 is a diagram of the individual software components in the platforms of the distributed processing system according to the implementation of the present invention.

Each of the MI components 730, 830 and 930 shown in FIG. 7 preferably includes both client components and server components. FIG. 8, which is a block diagram of a client platform 1000 and a server platform 1100, applies to any two of the platforms 700, 800, and 900 in FIG. 7.

Platforms 1000 and 1100 contain memories 1050 and 1150, respectively, and processors 1010 and 1110, respectively. The elements in the platforms 1000 and 1100 function in the same manner as similar elements described above with reference to FIG. 7. In this example, processor 1010 executes a client application 1020 and processor 1110 executes a server application 1120. Processors 1010 and 1110 also execute operating systems 1040 and 1140, respectively, and MI components 1030 and 1130, respectively.

MI components 1030 and 1130 each include a server call processor 1031 and 1131, respectively, an application call processor 1032 and 1132, respectively, and a garbage collector 1033 and 1133, respectively. Each of the MI components 1030 and 1130 also contains reference components, including reference data portions 1034 and 1134, respectively, reference counts 1035 and 1135, respectively, and grant period registers 1036 and 1136, respectively, for each reference that the respective MI component 1030 or 1130 monitors.

Application call processors 1032 and 1132 represent the client service and communicate with server call processors 1031 and 1131, respectively, which represent the server service. Because platforms 1000 and 1100 contain a server call processor, an application call processor, a garbage collector, and reference components, either platform can act as a client or a server.

For purposes of the discussion that follows, however, platform 1000 is designated the client platform and platform 1100 is designated as the server platform. In this example, client application 1020 obtains references to distributed resources and uses MI component 1030 to send dirty calls to the resources managed by MI component 1130 of server platform 1100.

Additionally, server platform 1100 may be executing a server application 1120. Server application 1120 may also use MI component 130 to send dirty calls, which may be handled by MI component 1130 when the resources of those dirty calls are managed by MI component 1130. Alternatively, server application 1120 may use MI component 1130 to send dirty calls to resources managed by MI component 1030.

Accordingly, server call processor 1031, garbage collector 1033, and reference count 1035 for MI component 1030 of client platform 1000 are not active and are therefore presented in FIG. 8 as shaded. Likewise, application call processor 1132 of MI component 1130 of the server platform 1100 is shaded because it is also dormant.

When client application 1020 obtains a reference corresponding to a resource, application call processor 1032 sends a dirty call, which server call processor 1131 receives. The dirty call includes a requested lease period. Server call processor 1131 increments the reference count 1135 for the reference in the dirty call and determines a grant period. In response, server call processor 1131 sends a return call to application call processor 1030 with the grant period. Application call processor 1032 uses the grant period to update recorded grant period 1035, and to determine when the resource corresponding to the reference of its dirty call may be reclaimed.

Server call processor 1131 also monitors the reference counts and grant periods corresponding to references for resources that it manages. When one of its reference counts 1135 is zero, or when the grant period 1135 for a reference has expired, whichever event occurs first, server call processor 1131 may initiate the garbage collector 1133 to reclaim the resource corresponding to the reference that has a reference count of zero or an expired grant period.

The leased-reference scheme according to the implementation of the present invention does not require that the clocks on the platforms 1000 and 1100 involved in the protocol be synchronized. The scheme merely requires that they have comparable periods of increase. Leases do not expire at a particular time, but rather expire after a specific time interval. As long as there is approximate agreement on the interval, platforms 1000 and 1100 will have approximate agreement on the granted lease period. Further, since the timing for the lease is, in computer terms, fairly long, minor differences in clock rate will have little or no effect.

The transmission time of the dirty call can affect the protocol. If MI component 1030 holds a lease to reference and waits until just before the lease expires to request a renewal, the lease may expire before the MI component 1130 receives the request. If so, MI component 1130 may reclaim the resource before receiving the renewal request. Thus, when sending dirty calls, the sender should add a time factor to the requested lease period in consideration of transmission time to the platform handling the resource of a dirty call so that renewal dirty calls may be made before the lease period for the resource expires.

F. Conclusion

In accordance with the present invention a distributed garbage collection scheme ensures referential integrity and eliminates memory leaks by providing granted lease periods corresponding to references to resources in the distributed processing system such that when the granted lease periods expire, so do the references to the resources. The resources may then be collected. Resources may also be collected when they are no longer being referenced by processes in the distributed processing system with reference to counters assigned to the references for the resources.

Alternative Embodiment of the Present Invention

Although an embodiment consistent with the present invention has been previously described as related to garbage collection, an alternative embodiment also consistent with the present invention provides a lease manager that manages access to leased network services. Thus, a client can use the lease manager to manage the client's leases on its behalf during periods when the client is inactivate (i.e., not in memory).

In a distributed system, users of the system may share services and resources over a network of many devices. A "network service" refers to a resource, data, or functionality that can be accessed by a user, program, device, or another network service and that can be computational, storage related, communication related, or related to providing access to another user. As used herein, a "client" refers to an entity that uses a network service, and a "server" refers to the provider of the network service (or the network service itself).

As described above, clients may lease access to a particular network service as an effective manner of sharing access to that network service with other clients. Such leases only remain active for a specified period of time absent an affirmative indication from a client to extend, or renew, the lease. Although a client will sometimes be rendered inactive to conserve memory, the client may still desire to maintain its lease with a given network service. For example, in a device having limited memory, a client (e.g., a data object) may have a lease on a file and may be rendered inactive to conserve memory. However, the client may wish to maintain its lease so that the file manager does not delete the file while the client is inactive. In this situation, the client may use the lease manager to renew its leases on its behalf and thus when the client becomes reactivated, it may continue to utilize the lease.

The problem of a client maintaining access to leased resources during periods when the client is inactive is especially important in the case of a lookup service. A lookup service defines a network's directory of services located within a distributed system comprised of multiple machines, and stores references to those network services. Typically, for each network service, the lookup service contains a stub object with methods that can be used by a client (e.g., a program) to access the network service (e.g., a printer). Once a client's leases with a lookup service expire, the client will no longer be able to view other network services listed in the lookup service and the client's entry in the lookup service is removed. Because the client will no longer be listed in the lookup service, other network services will be unaware that the client exists. In fact, if the client requires that another network service try to access it before it is reactivated, the client will remain permanently inactivated. The lookup service is further discussed in co-pending U.S. patent application Ser. No. 09/044,931, entitled "Dynamic Lookup Service in a Distributed System," assigned to a common assignee, filed on Mar. 20, 1998, which is incorporated herein by reference.

In accordance with an alternative embodiment of the present invention, a lease manager is provided that maintains leases on network services on behalf of clients. The lease manager leases its service to a client. Thus, if a client becomes inactive, the lease manager renews the client's leases with other network services. Further, the lease manager notifies a client if the client's lease with the lease manager is near expiration so that the client may activate itself and renew its lease with the lease manager. The lease manager also notifies clients of failed attempts to renew leases with the lease manger.

Figure 9:
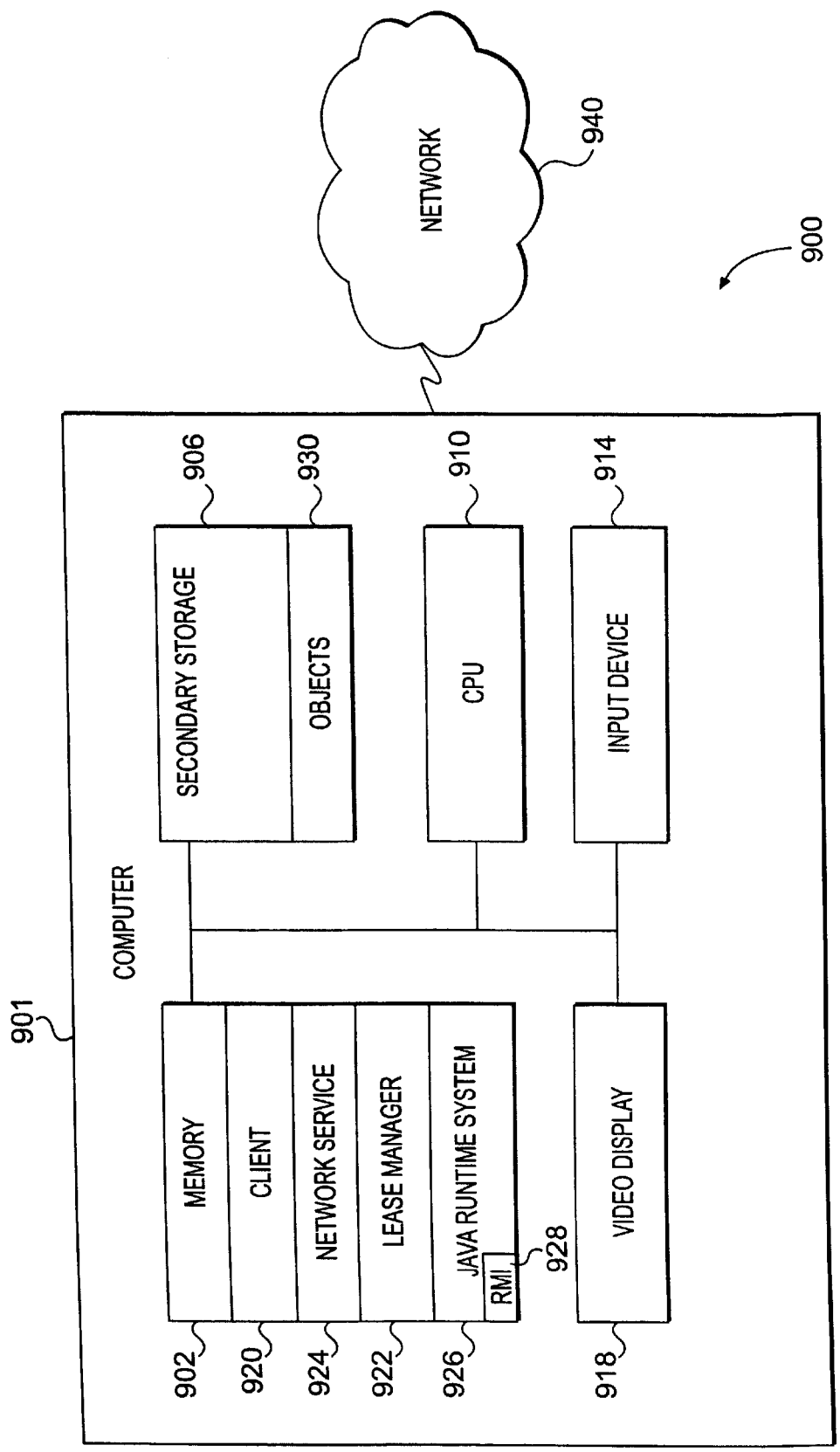
FIG. 9 depicts a data processing system for use with an alternative embodiment of the present invention.

FIG. 9 depicts a data processing system 900 suitable for use with this alternative embodiment of the present invention. Data processing system 900 includes a computer 901 connected to a network 940. Computer 901 includes a memory 902, a secondary storage device 906, a central processing unit (CPU) 910, an input device 914, and a video display 918. The memory 902 includes a client 920, a lease manager 922, a network service 924, a Java™ runtime system 926, and the Java remote method invocation system (RMI) 928. The secondary storage device 906 includes objects that store information reflecting lease management information used by the lease manager 922.

The Java runtime system 926 allows programs running on top of it to access, in a platform-independent manner, various system functions, including windowing capabilities and networking capabilities of the host operating system. The Java runtime system 926 is provided as part of the Java software development kit available from Sun Microsystems of Mountain View, Calif.

RMI 928 facilitates remote method invocation by allowing objects executing on one computer or device to invoke methods of an object on another computer or device. RMI 928 is also provided as part of the Java software development kit. RMI 928 includes four packages, one of which is entitled java.rmi. A "package" refers to a collection of related classes, interfaces, and exceptions. Java.rmi provides an interface, a class for accessing remote names, and a security manager for RMI. The security manager for RMI is implemented by a number of exception messages that may be sent to notify a user of a specific error condition. An "exception" refers to an event that alters the normal course of operation of a program. Exceptions are generated by the Java runtime system in response to errors that are detected as classes are loaded and their methods are executed. When the runtime system generates an exception, the operation may be referred to as "throwing" the exception. Runtime exceptions are objects. Further details on the runtime exception messages of the Java runtime system and the java.rmi package may be found in "Java 1.1 Developer's Guide" by Jamie Jaworski, Sams.net Publishing Second Edition, 1997, incorporated herein by reference.

The lease manager 922 enters into a lease arrangement with a client 920, whereby the lease manager agrees to renew leases between the client 920 and a network service 924, on behalf of the client 920, for a specified period of time. Once the lease manager 922 has been initialized, it remains active on an ongoing basis. A client 920 requests renewal of its leases with the lease manager 922 as needed. The lease manager 922 grants leases that are generally of a longer duration than leases granted by other network services. Therefore, the leases granted by the lease manager 922 will be sufficiently long so that the renewal calls will not place an excessive load on the client 920, the lease manager 922, or the network 940. The lease manager 922 may be used to manage leases for a variety of network services including, for example, leasing storage described in greater detail in co-pending U.S. patent application Ser. No. 09/044,923, entitled "Method and System for Leasing Storage," assigned to a common assignee, filed on Mar. 20, 1998, which is incorporated herein by reference; leasing of delegation certificates, described in greater detail in co-pending U.S. patent application Ser. No. 09/044,838, entitled "Method, Apparatus and Product for Leasing of Delegation Certificates in a Distributed System," assigned to a common assignee, filed on Mar. 20, 1998, which is incorporated herein by reference; and leasing of group membership, described in greater detail in co-pending U.S. patent application Ser. No. 09/044,834, entitled, "Method, Apparatus, and Product for Leasing of Group Membership in a Distributed System," assigned to a common assignee, filed on Mar. 20, 1998, which is incorporated herein by reference.

Although this alternative embodiment of the present invention has been described as operating in a distributed system and the Java programming environment, one skilled in the art will appreciate that this embodiment of the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM, either currently know or later developed. Sun, Sun Microsystems, the Sun Logo, Java and Java-based trademarks are trademarks or registered trademarks of Sun Microsystems, Inc. in the United States and other countries.

Interface to the Lease Manager

As shown below, the interface to the lease manager provides a number of methods that allow a client to interact with the lease manager. More specifically, the lease manager provides a method, createLeaseMgmtSet (see Code Table 1 below), that allows a client to group existing leases with other network services into lease management sets, or sets. A set is an entity used by the lease manager to manage leases. Further details of a set will be discussed below. The lease manger also provides an interface to the sets, LeaseMgmtSet interface (see Code Table 1 below), which includes seven methods defined on a set: addLease, setExpirationWarningListener, clearExpirationWarningListener, setRenewalFailureListener, clearRenewalFailureListener, removeLease, and getSetLease. These methods allow a client to perform operations on a set. Each of these methods will be further described below.

CODE TABLE 1

```
package com.sun.jini.lease;
public interface LeaseRenewalLookup service {
    public LeaseMgmtSet createLeaseMgmtSet {long leaseDuration}
    throws RemoteException
}
public interface LeaseMgmtSet {
    public void addLease (Lease leaseToRenew,
            long    membershipDuration)
        throws RemoteException, UnknownLeaseException;
    public EventRegistration setExpirationWarningListener (
            RemoteEventListener    listener,
            long                    minWarning,
            MarshalledObject        handback)
        throws RemoteException, UnknownLeaseException;
    public void clearExpirationWarningListener ()
        throws RemoteException, UnknownLeaseException;
    public EventRegistration setRenewalFailureListener (
```

CODE TABLE 1-continued

```
        RemoteEventListener    listener,
        MarshalledObject       handback)
    throws RemoteException, UnknownLeaseException;
public void clearRenewalFailureListener ()
    throws RemoteException, UnknownLeaseException;
public Lease removeLease (Lease leaseToRemove)
    throws RemoteException, UnknownLeaseException;
public Lease getSetLease ();
}
```

As shown above, the createLeaseMgmtSet is used to create a set. A set is an entity used by the lease manager to manage leases between clients and network services. The sets include methods defined on the sets themselves. A set may consist of one or more leases. Each lease in a set need not be granted by the same host and can be independently added to or removed from the set. To utilize the createLeaseMgmtSet, a client sends an appropriate request to the lease manager. The lease manager in turn executes the createLeaseMgmtSet method. The leaseDuration argument specifies how long (in milliseconds) the client wants the set's initial duration to be. This duration must be positive. The initial duration of the set's lease will be equal to or shorter than the requested duration.

Figure 10:
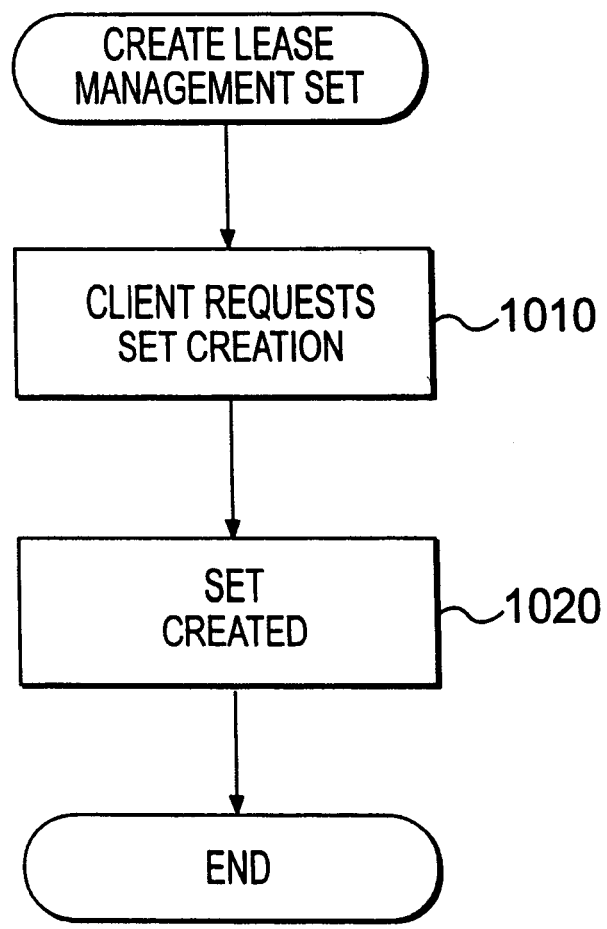
FIG. 10 depicts a flow chart of a method used to create a set in an alternative embodiment of the present invention.

FIG. 10 depicts a flowchart of the steps performed by the createLeaseManagementSet method. First, a client sends a request to the lease manager to create a set (step 1010). The lease manager then creates a set (Step 1020). After the set is created, processing ends.

A client may cancel a lease on a set at any time while the set remains active. The method used to cancel a lease is included as part of the lease object itself. Once a lease on a set has been canceled the lease manager destroys the set and does not take further action on any of the leases within the set. The lease manager will not cancel a lease unless it receives an affirmative cancellation request from a client. Upon receiving a cancellation request from a client, the lease manager will cancel a lease specified in the request.

After a set has been created, a client may use any of the seven methods defined on the set. A client may use the addLease method to add a lease between a client and a network service, other than the lease manager, to a set. The addLease method may not be used on a lease granted by the lease manager. A client may not add a lease to a set if it is already in another.

The addLease method includes several parameters. The leaseToRenew argument specifies the lease being added to the set. The membershipDuration argument specifies the initial time duration that a lease will be in the set. The membership duration is unilaterally specified by the client, rather than negotiated between the client and the server. The duration value may be specified as any value between 1 and a maximum value defined by a user. Otherwise, the lease manager sends an illegal argument error to the client. Each lease in a set may have a different expiration time. After a leases's membership duration expires, the lease will be removed from the set without further client intervention. The lease manager will not renew a lease for a period that extends beyond its membership duration.

In addition, the addLease method may generate, or throw, an exception class if the appropriate conditions for complete processing of the method are not met. The exception classes thrown by the addLease method include Remote Exception, Unknown Lease Exception, and Illegal Argument Exception. Each of the exception classes will be referenced below relative to the conditions that cause them to be thrown. The setExpirationWarningListener, clearExpirationWarningListener, setRenewalFailureListener, clearRenewalFailureListener, and removeLease methods may also throw these exception classes if the appropriate conditions for processing are not met. Each of the exception classes thrown by the other methods included in the interface to the lease manager is discussed below relative to the conditions that cause them to be thrown.

If a client invokes the addLease method on a lease that is already in a set, the method will associate the existing lease with the membership duration specified by the most recent call to addLease. If a client attempts to invoke the addLease method to add a lease to a set that no longer exists, the method will throw an exception in the form of UnknownLeaseException. If a client and the lease manager experience a communication failure such that the client is unable to reach the lease manager the addLease method will send a RemoteException to the client. If a client invokes the addLease method for a lease that is currently a member of another set allocated by the same lease manager, an IllegalArgumentException will be thrown.

Once placed in a set, a lease will stay there until the lease on the set itself expires or is canceled, the lease is removed from the set by the client, the lease expires, the lease's membership duration expires, or a renewal call results in anything but a normal return or a specified failure message.

Figure 11:
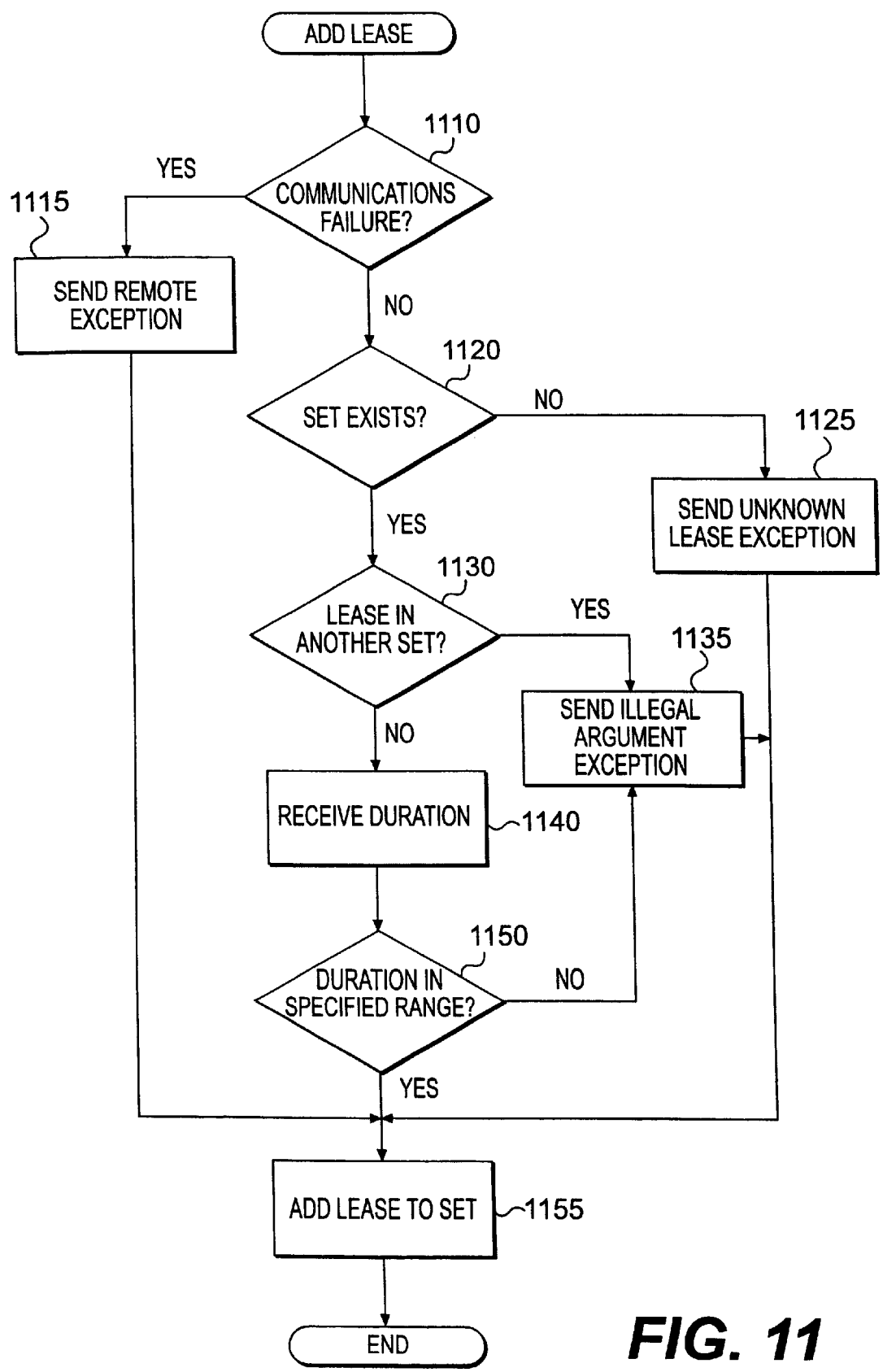
FIG. 11 depicts a flow chart of a method used to add a lease to a set in an alternative embodiment of the present invention.

FIG. 11 depicts a flowchart of the steps performed by the addLease method. If the lease manager fails to respond to a client's request to add a lease to a set, then the request was not completed, probably due to a communications failure (step 1110). In this situation, a RemoteException is thrown and processing ends (step 1115). Otherwise, processing continues to step 1120 and the lease manager determines whether the specified set exists. If the specified set does not exist, then an UnknownLeaseException is thrown and processing ends (step 1125). Otherwise, processing continues and the lease manager determines whether the lease belongs to another set (step 1130). If the lease belongs to another set then an exception in the form of IllegalArgumentException is thrown and processing ends (step 1135). Otherwise, the lease manager receives information from the client indicating the duration of the lease (step 1140). Next, the lease manager determines whether the specified lease duration falls in a range between 1 and a specified maximum value (step 1150). If the lease duration does not fall with this range, the lease manager throws an IllegalArgumentException (step 1135). Otherwise, if the lease duration falls in the specified range, the lease is added to the set (step 1155), and processing ends.

There is an event associated with each set that occurs at a client-specified time before the lease on a set expires. The setExpirationWarningListener method allows a client to register to receive the event indicating that a set's lease is near expiration. This method creates a lease between the client and the lease manager for notification of the event. The duration of the lease corresponds to the duration of the lease on the set. This lease may be canceled by the client at any time by the clearExpirationWarningListener, discussed below. When a client registers with this method to receive the notification event, the event registration is assigned a unique identification code.

The event registration request includes a listener argument, a minWarning argument and a handback argument. The listener argument specifies which client to notify that the lease is about to expire. The minWarning argument specifies, in milliseconds, how long before lease expiration the event should be generated. The handback argument specifies an object that will be included as part of the expiration warning event notification.

A client that has registered for the setExpirationWarningListener method will receive an event indicating that a set's lease will expire at the time corresponding to minWarning. If the current expiration of the set's lease is sooner than minWarning, then the event will occur immediately.

Figure 12:
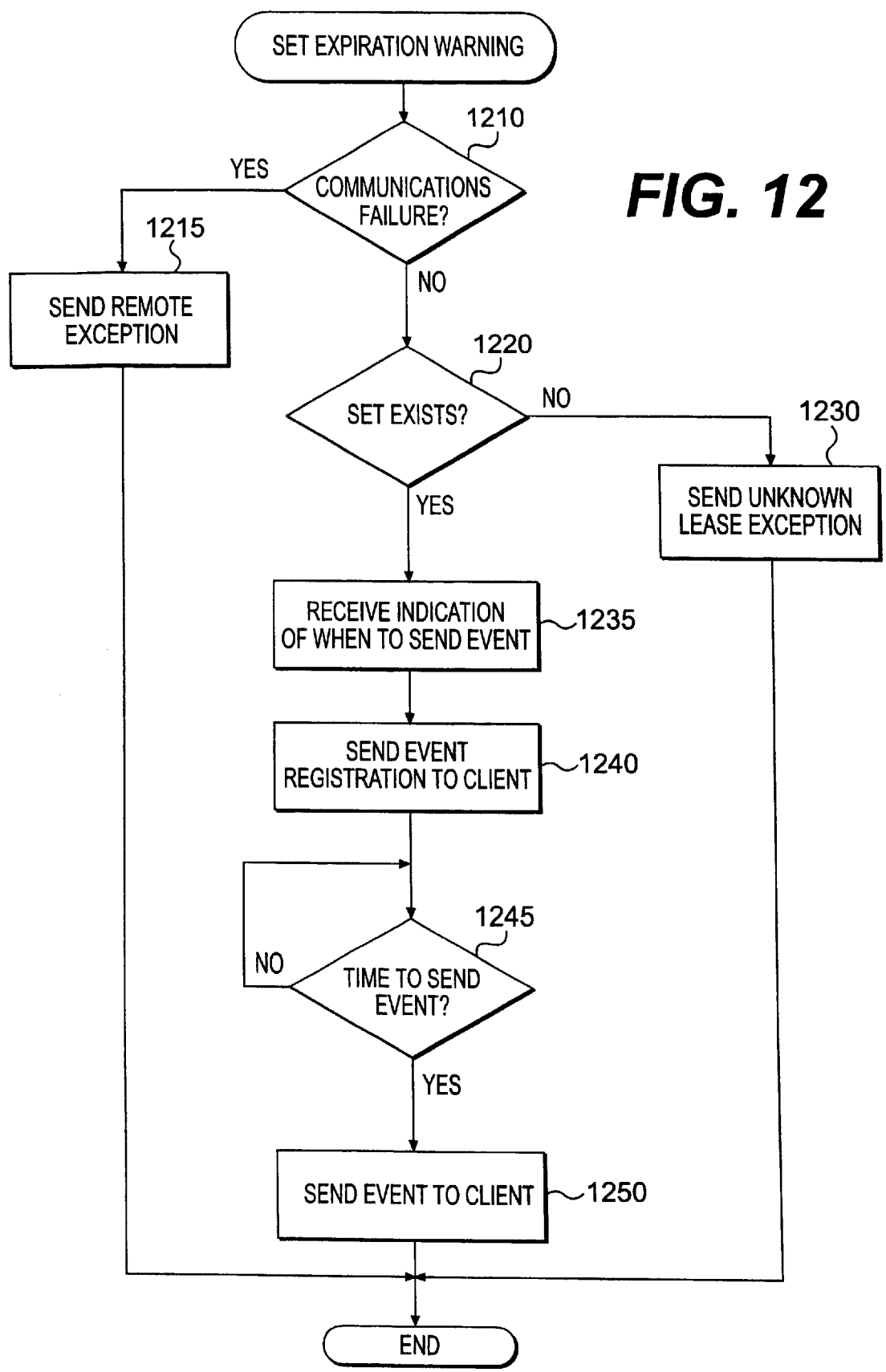
FIG. 12 depicts a flow chart of a method used to notify a client of a lease expiration event in an alternative embodiment of the present invention.

FIG. 12 depicts a flowchart of the steps performed by the setExpirationWarningListener method. If the lease manager fails to respond to an appropriate client call to this method, then a communications error has occurred (step 1210), a RemoteException is thrown, and processing ends (step 1215). Otherwise, if the lease manager receives the registration request, it determines whether the specified set exists (step 1220). If the set does not exist, an UnknownLease Exception is thrown and processing ends (step 1230). If the set does exist, processing continues and the lease manager receives an indication, included as part of the registration requested, of when an expiration warning event should be sent to the client (step 1240). When an expiration warning condition occurs (step 1245), the lease manager sends an event to the client (1250). The setExpirationWarning method waits idle if the event conditions fail to occur. After an event is sent to the client (step 1250), processing ends.

The clearExpirationWarningListener method removes an event registration associated with an event indicating that a set's lease is near expiration. This method cancels the lease between a client and the lease manager for notification of an expiration event. When invoking this method, a client specifies the set for which the expiration warning event registration is to be removed. A client may call this method even if a set does not have an active event registration.

Figure 13:
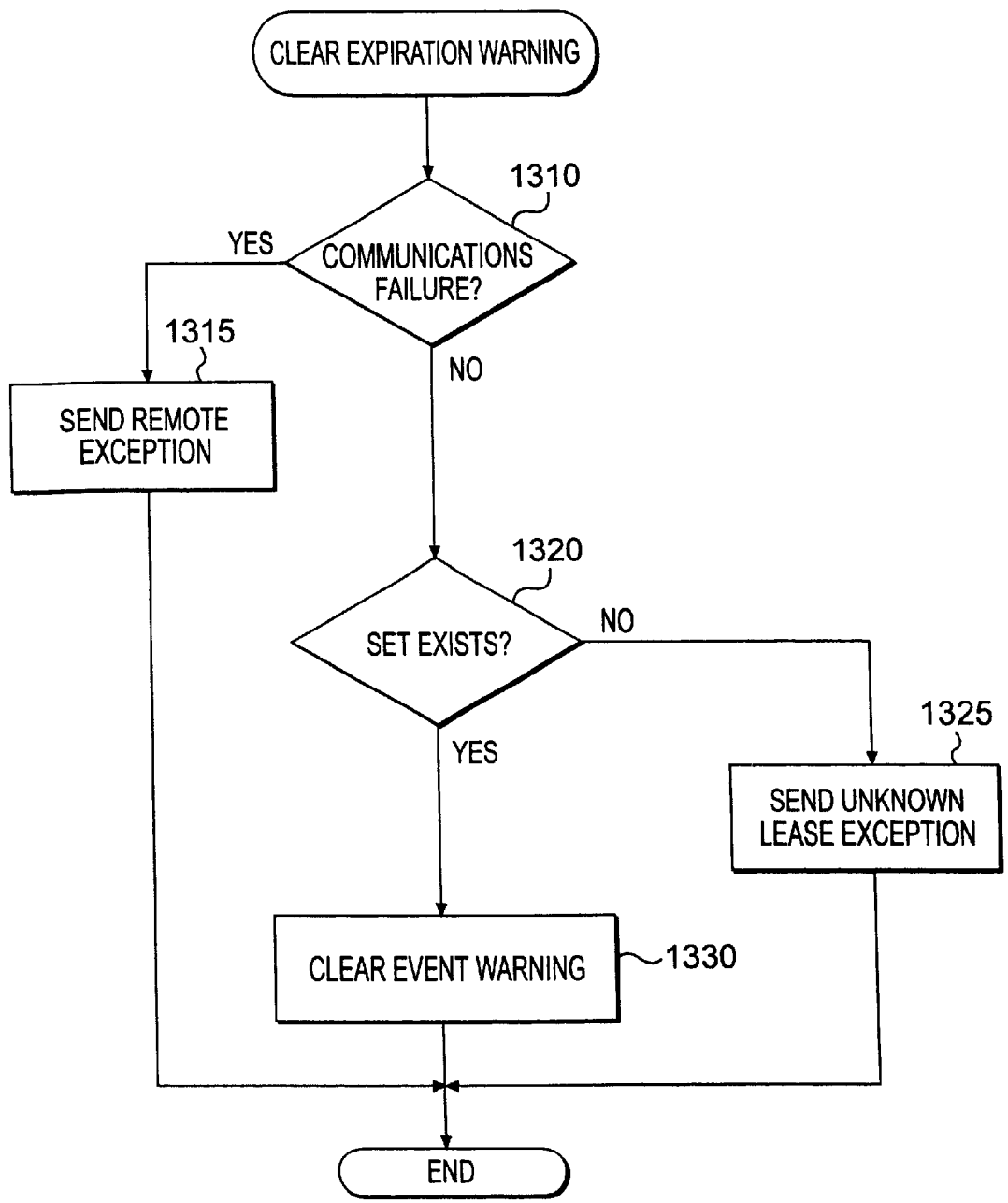
FIG. 13 depicts a flow chart of a method used to clear an event that notifies a client of a lease expiration in an alternative embodiment of the present invention.

FIG. 13 depicts a flow chart of the steps performed by the clearExpirationWarningListener method. If the lease manager fails to respond to an appropriate client call to this method, a communications failure has occurred (step 1305), a RemoteException is thrown and processing ends. Otherwise, processing continues. If the request is received, the lease manager determines wether the specified set exists (step 1320). If the set does not exist the lease manager throws an UnknownLeaseException and processing ends (step 1325). Otherwise, the lease manager clears the event warning (step 1330).

The setRenewalFailureListener method allows a client to register to receive an event indicating that a lease in the specified set has expired, or that the lease manager was unsuccessful in renewing a lease, i.e., the lease renewal attempt returned something other than a normal return or a RemoteException. This registration creates a lease between the client and the lease manager. The registration will have the same expiration as the set to which the client belongs. The lease manager assigns each registration a unique event identification code.

A registration request includes a listener, a minWarning argument and a handback argument. The listener argument specifies which client to notify that the lease is about to expire. The minWarning argument specifies, in milliseconds, how long before lease expiration the event should be generated. The handback argument specifies an object that will be included as part of the expiration warning event notification.

If a client has registered with the setRenewalFailureListener method, the client will receive a renewal failure event. In response to the event the client may re-request renewal of the lease on the set and the lease manager will continue attempting to renew the lease. If the client does not respond to the event, or if the client has not registered with the setRenewalFailureListener method, the lease manager will allow the set to expire and destroy it.

Figure 14:
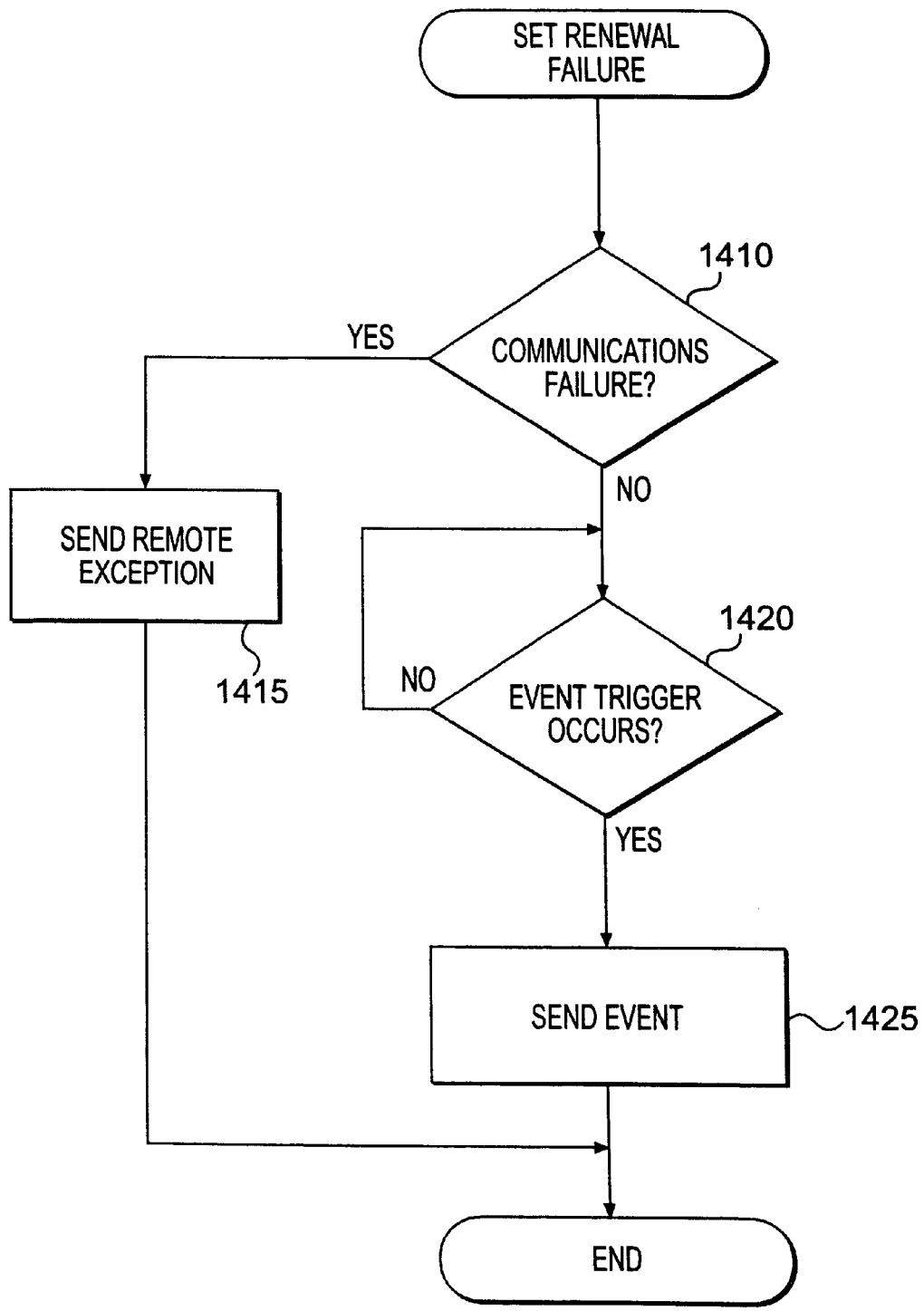
FIG. 14 depicts a flow chart of a method used to notify a client of a failed attempt to renew a lease in an alternative embodiment of the present invention.

FIG. 14 depicts the steps performed by the setRenewalFailureListener method. If the lease manager fails to respond to an appropriate client call to this method, a communications error has occurred (step 1410), a RemoteException is thrown and processing ends (step 1415). Otherwise, processing continues and the lease manager awaits occurrence of an appropriate event trigger (step 1420). An appropriate event trigger includes minWarning time occurring with respect to a lease in a set expiring, or an unsuccessful lease renewal. If an event trigger occurs, the lease manager sends an event to the client (1425). Otherwise, the lease manager awaits occurrence of an event trigger. Once an event has been sent to the client, processing ends.

The clearRenewalFailureListener method removes an event registration associated with an event indicating a failure to renew a lease in a set. This method may be called even if there is no active registration. If a set no longer exists and a client attempts to call this method, the lease manager will return an error message to the client.

Figure 15:
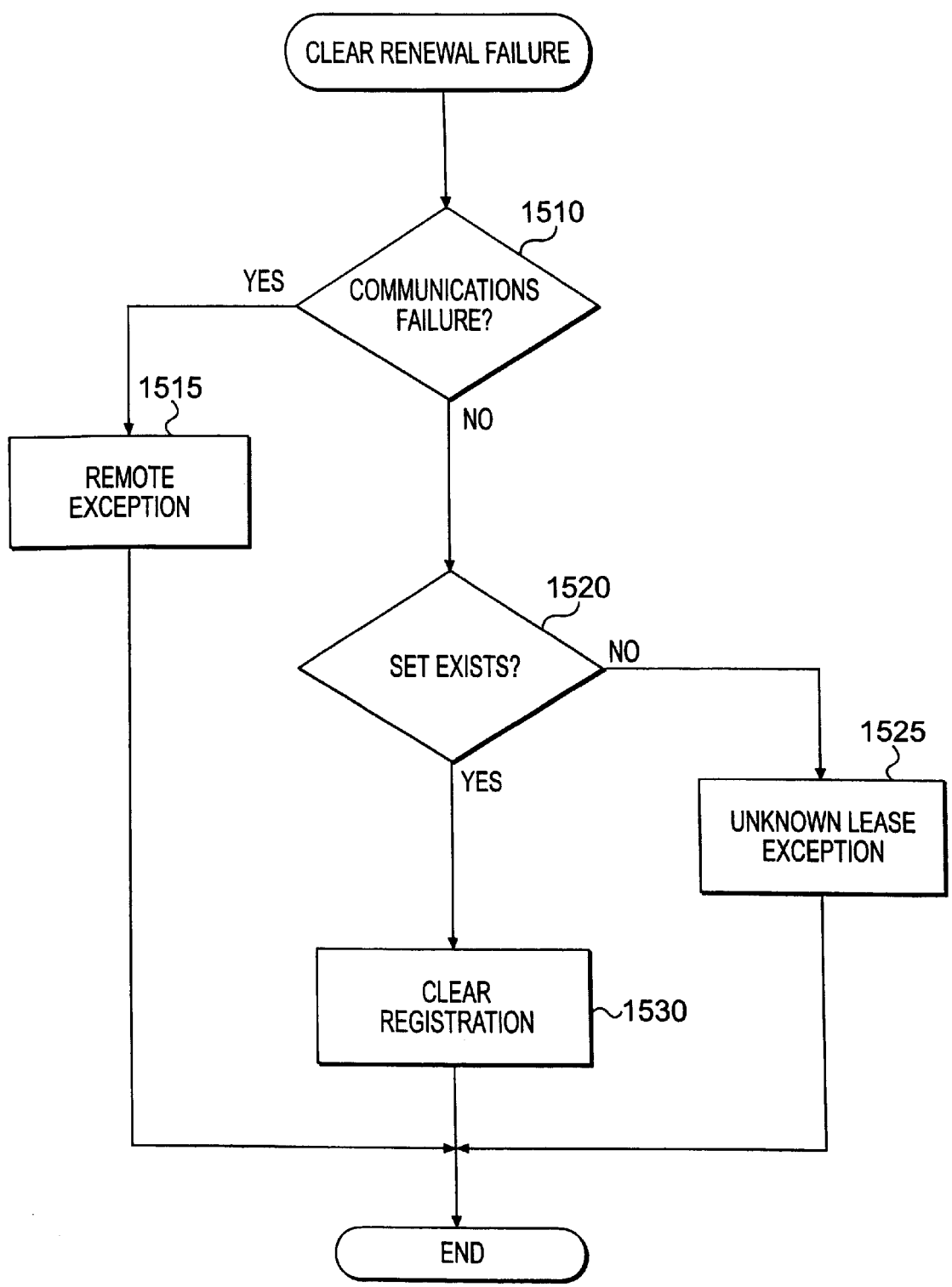
FIG. 15 depicts a flow chart of a method used to clear an event that notifies a client of a failed attempt to renew a lease in an alternative embodiment of the present invention.

FIG. 15 depicts the steps performed by the clearRenewalFailureListener method. If the lease manager fails to respond to an appropriate client call to this method, a communications failure has occurred (step 1505) a RemoteException is thrown, and processing ends. Otherwise, if the request is received, the lease manager determines wether the specified set exists (step 1520). If the set does not exist the lease manager throws an UnknownLeaseException and processing ends (step 1525). Otherwise, the lease manager clears the registration for the event warning (step 1530).

A client may remove a lease from a set by using the removeLease method. Removal from a set does not cancel a lease, but rather it merely removes the lease from the set. The expiration time of a lease that has been removed from a set will be set to either the time resulting from the last successful renewal call made by the lease manager, or the expiration time the lease originally had when it was added to the set if the lease manager had not yet successfully renewed the lease. The removeLease method includes a leasetoRemove argument that identifies the lease will be removed from a set.

Figure 16:
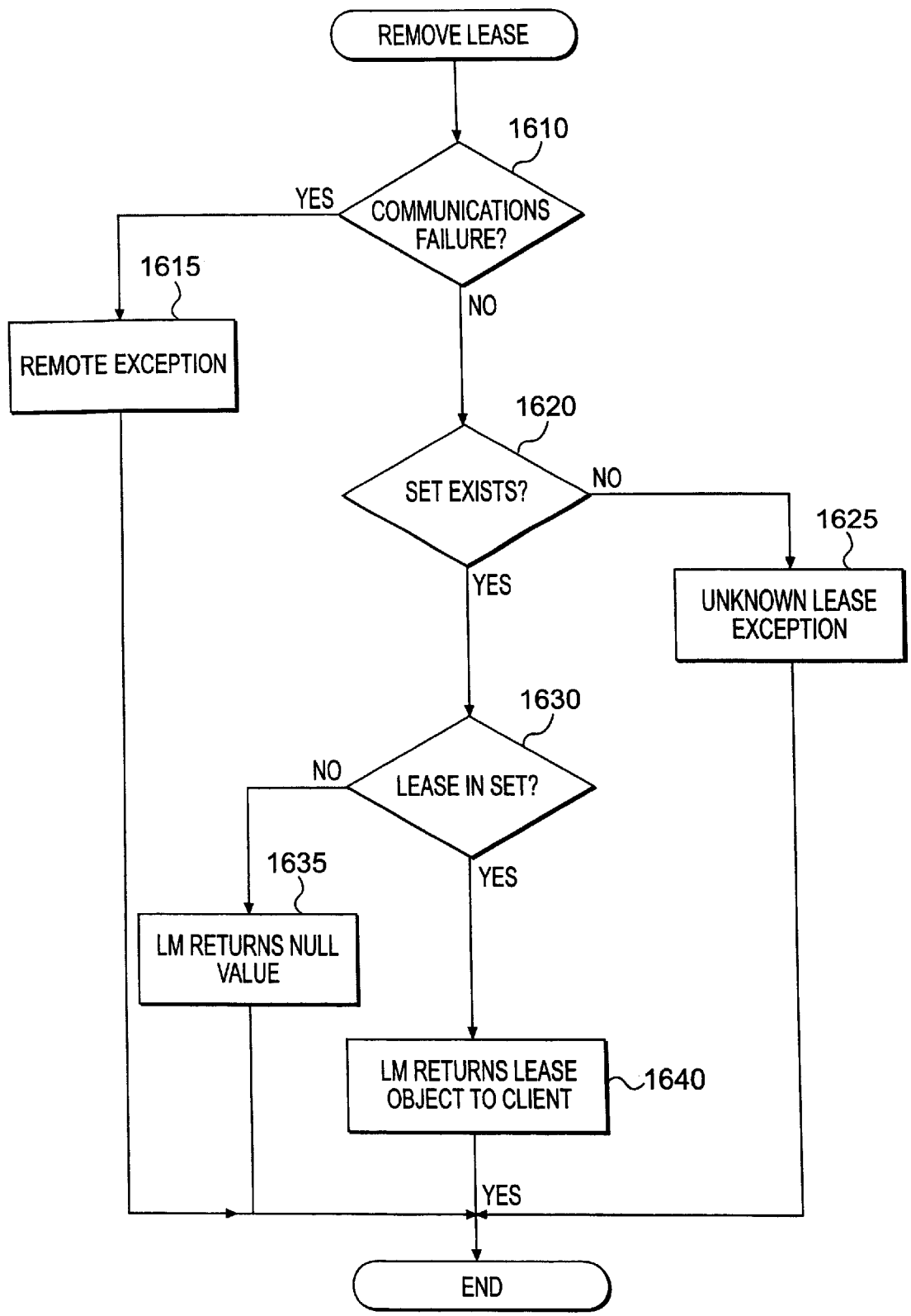
FIG. 16 depicts a flow chart of a method used to remove a lease from a set in an alternative embodiment consistent with the present invention.

FIG. 16 depicts a flow chart of the steps performed by the removeLease method. If the lease manager fails to respond to an appropriate client call to this method, a communications failure has occurred, a RemoteException is thrown, and processing ends (step 1615). Otherwise, the lease manager determines whether the set from which a lease is to be removed exists (step 1620). If the set does not exist, an UnknownLeaseException is thrown and processing ends (step 1625). However, if the set exists, the lease manager determines whether the specified lease is in the set (step 1630). If the specified lease is not in the specified set, the lease manager returns a null value to the client and processing ends (step 1635). If the specified lease is in the specified set then the lease manager returns the lease object to the client (step 1640).

Figure 17:
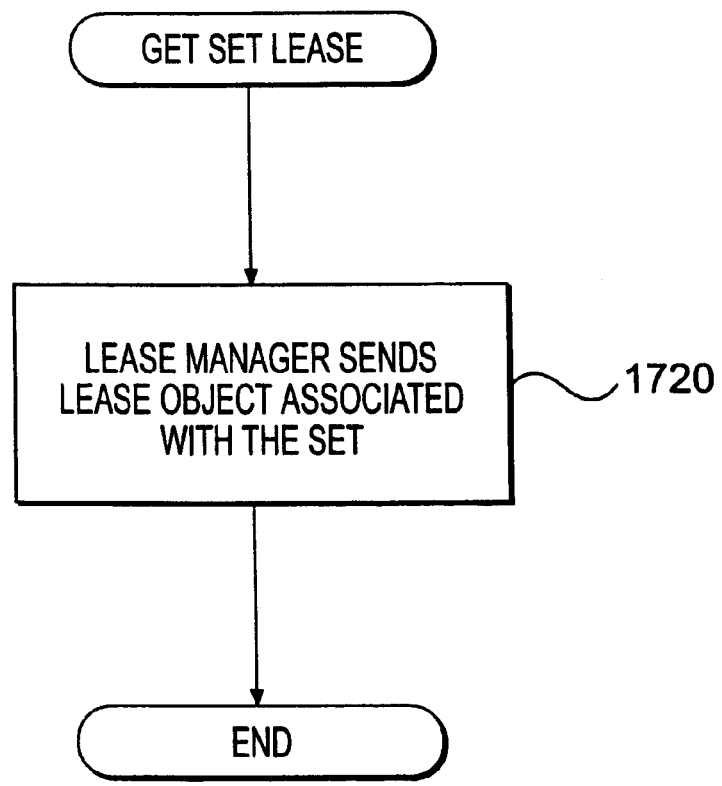
FIG. 17 depicts a flow chart of a method used to receive a lease in an alternative embodiment consistent with the present invention.

As described above, information identifying sets and leases between the lease manager and clients is maintained as objects in a secondary storage area. The lease manager may retrieve these objects as needed. The getSetLease method returns the lease associated with a specified set. FIG. 17 depicts a flow chart of the steps performed by the getSetLease method. In response to an appropriate client invocation request, the getSetLease method returns a lease object corresponding to the specified lease on the set (step 1720). This ends processing of the getSetLease method.

Similarly, the getLease method returns a specified lease on a network service that is managed by the lease manager. It is called by states associated with exceptions that occur with respect to individual leases, rather than with respect to a lease on a set. Code table 2, below, lists two states associated with exceptions that may invoke the getLease method.

CODE TABLE 2

```
package com.sun.jini.lease;
public class ExpirationWarningEvent extends RemoteEvent {
    public Expiration WarningEvent  (Object          source,
                                     long            eventID,
                                     long            seqNum,
                                     MarshalledObject handback
                                     Lease           lease);
    public Lease getLease ();
}
public class RenewFailureEvent extends RemoteEvent {
    public RenewFailureEvent  (Object          source
                               long            eventID,
                               long            seqNum,
                               MarshalledObject handback,
                               Lease           lease,
                               Throwable       throwable);
    public Lease getLease () {};
    public Throwable getThrowable();
}
```

The ExpirationWarningEvent object is returned to a client when a lease between the client and a network service is about to expire. The object includes a method called getLease, which returns to the client information identifying the lease nearing expiration. The expiration of the returned lease reflects the expiration time the lease had when the event occurred. Renewal calls may have changed the actual expiration time of the lease from the time the event was generated and delivered.

The RenewFailureEvent object is returned to a client when an attempt to renew a lease between the client and a network service fails. The delivery of this event indicates that an attempt to renew a lease between a client and a network service failed. The object includes a method called getLease, which returns information to the client identifying the lease that was not renewed. The object also provides to the client information reflecting any exception that was thrown. If the lease manager was able to renew the lease before it expired, the lease's expiration time will reflect the result of the last successful renewal call. When a renewal failure event is not corrected, the lease is removed from its associated set, but is not canceled. The lease will continue to exist until it expires.

By its affirmative renewal requirement, the lease manager allows clients no longer needing to access the lease manager to terminate its lease with the lease manager without any required action, and forces clients that have experienced unrecoverable failures to release their relationship with the lease manager. This proves most useful when, for example, in the case of a lease to a lookup service, a failed client should no longer be listed there anyhow. Therefore, by automatically canceling any lease that is not affirmatively renewed by a client, the lease manager assists in ensuring that the lookup service maintains an accurate listing of available services.

An Exemplary Usage of the Lease Manager

Figure 18:
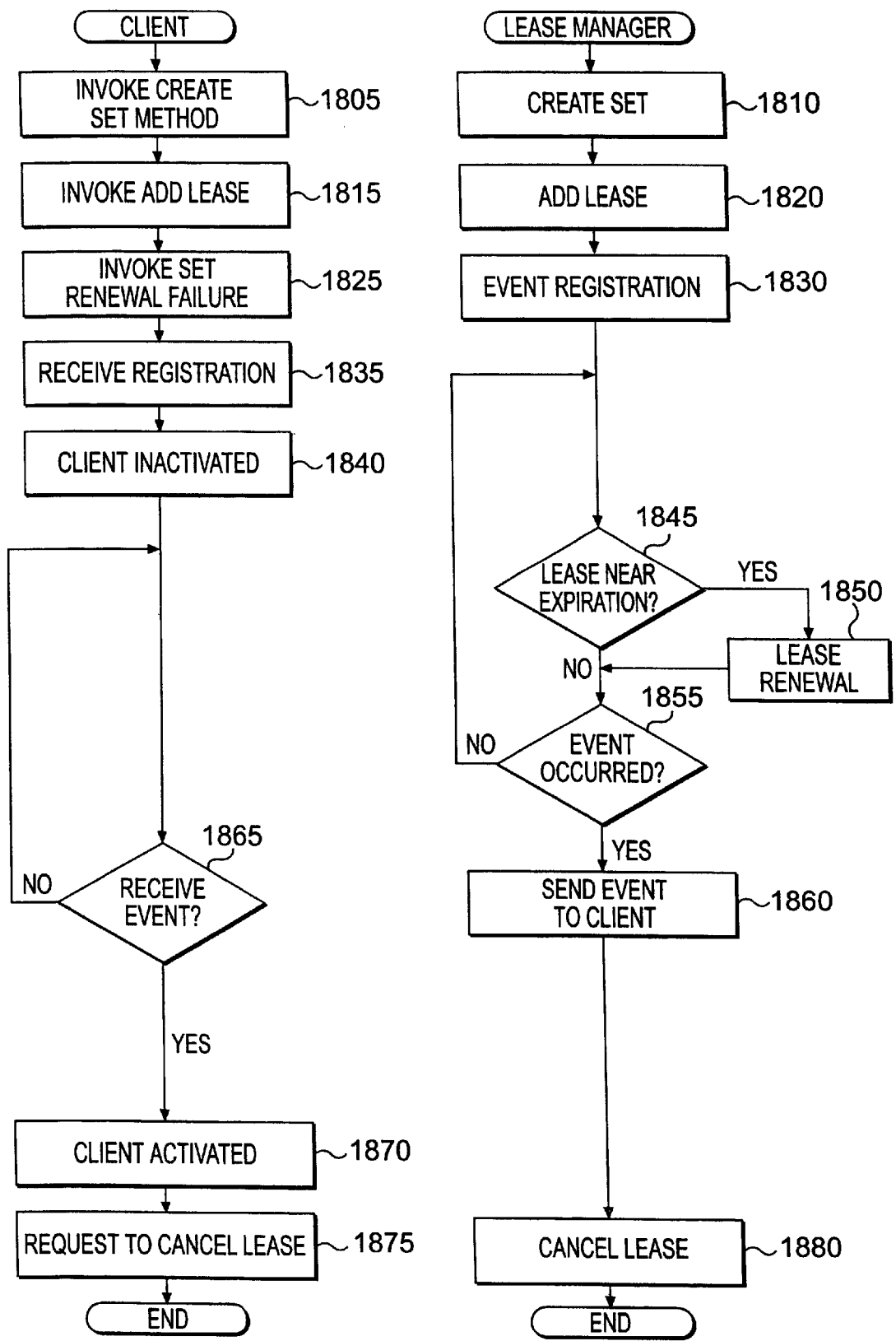
FIG. 18 depicts a flow chart of an exemplary usage of an alternative embodiment of the present invention.

FIG. 18 depicts a flowchart of the steps performed by a client and a lease manager in connection with an exemplary usage of the lease manager of an alternative embodiment of the present invention. This flowchart depicts the chronological steps performed by both a client and the lease manger.

First, the client invokes the createSet method, to create a set, by sending an appropriate request, specifying the duration of a lease on a set, to the lease manager (step 1805). Responsive to the request to create a set, the lease manager creates the set by populating it with leases, as discussed above with respect to FIG. 10 (step 1810).

Next, the client adds a lease to the set by invoking the addLease method. The client invokes the addLease method by sending an appropriate request, specifying the lease to be added and its membership duration, to the lease manager (step 1815). The lease manager receives the request and executes the addLease method, described above with respect to FIG. 11 (step 1820). If an exception occurs during processing of the method, that exception will be thrown. Otherwise, the specified lease is added to the specified set.

After adding a lease to the set, the client invokes the setRenewalFailure method, allowing it to register to receive notification of a lease renewal failure, by sending an appropriate request (step 1825). Responsive to the invocation, the setRenewalFailure method registers the client for the event notification, assigns a unique event registration code to the registration, and sends the event registration to the client as described above with respect to FIG. 14 (step 1830). The client then receives the event registration (step 1835).

Next, the client inactivates itself to conserve its resources (step 1840). The client remains inactive until it receives an event notification from the lease manager. While the client is inactive the lease manager remains active, monitoring the client's leases on its behalf. The lease manager maintains a status of the leases it is currently managing and determines whether a lease with a network service is near expiration (step 1845). If a lease is near expiration, the lease manager renews the lease (step 1850). Otherwise, the lease manager awaits an indication that a lease between the lease manager and the client is near expiration (step 1855). Upon determining that a lease between the lease manager and the client is near expiration, the lease manager sends an event to the client (step 1860). The client activates upon receiving the event (step 1870). When the client activates, it sends a request to cancel the lease on the set (step 1875). Upon receiving the request to cancel the lease on the set, the lease manager cancels the lease and takes no further action with regard to any of the leases that were in the canceled set, and processing ends (step 1880).

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation may be implemented as a combination of hardware and software, or hardware alone. Additionally, although described as operating in a Java environment, methods and systems consistent with an implementation of the present invention could operate in other environments, such as other object-oriented programming environments or non-object-oriented programming environments. The scope of the invention is defined by the appended claims and their equivalents.

What is claimed is:

1. A method in a data processing system, containing a client, a lease manager, a first remote infrastructure for granting a first lease on a first resource, and a second remote infrastructure for granting a second lease on a second resource, the method performed by the lease manager comprising:

receiving an indication of the first and second leases from the first and second infrastructures, respectively;

creating a lease set including information corresponding to at least the first and second leases; and managing, on behalf of the client, any of the first and second leases that has corresponding information included in the lease set.

2. The method of claim 1, wherein managing the leases further comprises:

requesting renewal of at least one of the leases included in the lease set.

3. The method of claim 1, wherein managing the leases further comprises:

removing one of the first and second leases from the lease set.

4. The method of claim 1, wherein managing the leases further comprises:

providing an indication to the client when either of the first and second leases is about to expire.

5. The method of claim 1, wherein managing the leases further comprises:

providing an indication to the client that a request to renew either of the first and second leases has failed.

6. The method of claim 1, wherein managing the leases further comprises:

managing the leases included in the lease set on behalf of the client while the client is inactive, wherein the client is activated based on an event associated with one of the leases in the lease set.

7. A method in a data processing system including a client, a server, and a lease manager, the method performed by the lease manager comprising:

creating a lease set including at least one lease held by the client, wherein each lease in the set binds to a resource maintained by the server such that the client has exclusive access to the resource for a period of time;

receiving a request from the client to remove a first lease from the lease set; and removing the first lease from the lease set such that the client still holds the first lease following the removal of the first lease.

8. The method of claim 7, wherein the period of time is set when the first lease was previously renewed while included in the lease set.

9. The method of claim 7, wherein the period of time is set by the client when the first lease was previously added to the lease set and the client holds the removed first lease for the period of time.

10. The method of claim 7, wherein removing the first lease includes:

providing a lease object associated with the first lease to the client.

11. A data processing system for providing a service, the system comprising:

a client for providing a request to access a resource;

a lease manager for managing a lease to the service upon receipt of an indication of the lease created in response to the request; and a remote infrastructure for receiving the request, creating the lease, and sending the indication of the lease to the lease manager.

12. The system of claim 11, wherein the lease manager maintains a lease set that includes one or more leases created by the remote infrastructure, and manages the one or more leases.

13. The system of claim 11, wherein the lease manager manages a second lease upon receipt of a second indication of the second lease created in response to a second request for access to a second resource provided by the client, wherein the system further comprises:

a second remote infrastructure for receiving the second request, creating the second lease, and sending the second indication of the second lease to the lease manager.

14. A computer-readable medium including instructions for performing a method, when executed by a processor, in a data processing system containing a client, a lease manager, a first remote infrastructure for granting a first lease on a first resource, and a second remote infrastructure for granting a second lease on a second resource, the method performed by the lease manager comprising:

receiving an indication of the first and second leases from the first and second infrastructures, respectively;

creating a lease set including information corresponding to at least the first and second leases; and managing, on behalf of the client, any of the first and second leases that has corresponding information included in the lease set.

15. The computer-readable medium of claim 14, wherein managing the leases further comprises:

requesting renewal of at least one of the leases included in the lease set.

16. The computer-readable medium of claim 14, wherein managing the leases further comprises:

removing one of the first and second leases from the lease set.

17. The computer-readable medium of claim 14, wherein managing the leases further comprises:

providing an indication to the client when either of the first and second leases is about to expire.

18. The computer-readable medium of claim 14, wherein managing the leases further comprises:

providing an indication to the client that a request to renew either of the first and second leases has failed.

19. The computer-readable medium of claim 14, wherein managing the leases further comprises:

managing the leases included in the lease set on behalf of the client while the client is inactive; and activating the client based on an event associated with one of the leases in the lease set.

20. A computer-readable medium including instructions for performing a method, when executed by a processor, in a data processing system including a client, a server and a lease manager, the method performed by the lease manager comprising:

creating a lease set including at least one lease held by the client, wherein each lease in the set binds to a resource maintained by the server such that the client has exclusive access to the resource for a period of time;

receiving a request from the client to remove a first lease from the lease set; and removing the first lease from the lease set such that the client still holds the first lease following the removal of the first lease.

21. The computer-readable medium of claim 20, wherein the client holds the removed first lease for a time period that was set when the first lease was previously renewed while included in the lease set.

22. The computer-readable medium of claim 20, wherein the client holds the removed first lease for a time period that was set when the first lease was added to the lease set.

23. The computer-readable medium of claim 20, wherein removing the first lease includes:

providing a lease object associated with the first lease to the client.

24. A lease manager for managing a lease in a data processing system containing a client, a first remote infrastructure for granting a first lease on a first resource, and a second remote infrastructure for granting a second lease on a second resource, the lease manager comprising:

means for receiving an indication of the first and second leases from the first and second infrastructures, respectively;

means for creating a lease set including information corresponding to at least the first and second leases; and means for managing, on behalf of the client, any of the first and second leases that has corresponding information included in the lease set.

25. A lease manager for managing a lease in a data processing system including a client, a server, and a lease manager, the lease manager comprising:

means for creating a lease set including at least one lease held by the client, wherein each lease in the set binds to a resource maintained by the server such that the client has exclusive access to the resource for a period of time;

means for receiving a request from the client to remove a first lease from the lease set; and means for removing the first lease from the lease set such that the client still holds the first lease following the removal of the first lease.

* * * * *